United States Patent
Zink et al.

(10) Patent No.: US 10,282,615 B2
(45) Date of Patent: May 7, 2019

(54) SYSTEM AND METHOD FOR ROOT ASSOCIATION IN IMAGE DATA

(71) Applicants: VOLKSWAGEN AG, Wolfsburg (DE); AUDI AG, Ingolstadt (DE); PORSCHE AG, Stuttgart (DE)

(72) Inventors: Edmund Dawes Zink, McKinney, TX (US); Douglas Allen Hauger, San Francisco, CA (US); Lutz Junge, San Mateo, CA (US); Jerramy L. Gipson, Willits, CA (US); Allen Khorasani, San Mateo, CA (US); Nils Kuepper, Millbrae, CA (US); Stefan T. Hilligardt, Half Moon Bay, CA (US)

(73) Assignees: Volkswagen AG (DE); Audi AG (DE); Porsche AG (DE)

( * ) Notice: Subject to any disclaimer, the term of this patent is extended or adjusted under 35 U.S.C. 154(b) by 14 days.

(21) Appl. No.: 15/619,992

(22) Filed: Jun. 12, 2017

(65) Prior Publication Data
US 2018/0173954 A1    Jun. 21, 2018

Related U.S. Application Data

(63) Continuation-in-part of application No. 15/386,220, filed on Dec. 21, 2016.

(51) Int. Cl.
*G06K 9/00* (2006.01)
*G06K 9/46* (2006.01)
(Continued)

(52) U.S. Cl.
CPC ........ *G06K 9/00711* (2013.01); *G06K 9/4671* (2013.01); *G06N 3/02* (2013.01); *G06T 7/20* (2013.01); *G06T 7/215* (2017.01); *G06T 7/246* (2017.01); *G06K 9/4609* (2013.01); *G06N 3/049* (2013.01); *G06T 2207/10016* (2013.01);
(Continued)

(58) Field of Classification Search
CPC .......... G06K 9/00093; G06K 9/00067; G06K 9/00073; G06K 9/00013; G06K 9/66; G06K 9/4671; G06K 9/00711; G06K 9/4609; G06F 17/30247; G06F 17/30259; G06F 17/3028; G06F 21/32; G06F 17/30252; H04L 9/3231; B25J 9/161; G05D 1/0246; G06T 7/246; G06T 2207/10016; G06T 2207/20072; G06T 2207/20004; G06T 2207/10024; G06T 7/20; G06T 7/215; G06N 3/02; G06N 3/049
See application file for complete search history.

(56) References Cited

U.S. PATENT DOCUMENTS 6,020,953 A    2/2000    Barrows
6,023,521 A    2/2000    Sarpeshkar et al.
(Continued)

OTHER PUBLICATIONS

Floreano et al.; Miniature curved artificial compound eyes; PNAS; Jun. 4, 2013; pp. 9267-9272; vol. 110, No. 23.
(Continued)

*Primary Examiner* — Manav Seth
(74) *Attorney, Agent, or Firm* — Barnes & Thornburg LLP

(57) ABSTRACT

A system and methodologies for neuromorphic (NM) vision simulate conventional analog NM system functionality and generate digital NM image data that facilitate improved object detection, classification, and tracking.

72 Claims, 21 Drawing Sheets

(51) Int. Cl.
    *G06T 7/246* (2017.01)
    *G06N 3/02* (2006.01)
    *G06T 7/20* (2017.01)
    *G06T 7/215* (2017.01)
    *G06N 3/04* (2006.01)

(52) U.S. Cl.
    CPC .............. *G06T 2207/10024* (2013.01); *G06T 2207/20004* (2013.01); *G06T 2207/20072* (2013.01); *G06T 2207/30252* (2013.01)

(56) References Cited

U.S. PATENT DOCUMENTS

| | | |
|---|---|---|
| 6,212,289 B1 | 4/2001 | Sarpeshkar et al. |
| 6,384,905 B1 | 5/2002 | Barrows |
| 7,659,967 B2 | 2/2010 | Barrows et al. |
| 7,925,051 B2 | 4/2011 | Gensolen et al. |
| 8,098,886 B2 | 1/2012 | Koch et al. |
| 8,332,340 B2 | 12/2012 | Snider |
| 8,401,297 B1 | 3/2013 | Apostolos et al. |
| 8,694,449 B2 | 4/2014 | Weng et al. |
| 8,780,240 B2 | 7/2014 | Posch et al. |
| 8,930,291 B1 | 1/2015 | Srinivasa et al. |
| 8,959,040 B1 | 2/2015 | Cruz-Albrecht et al. |
| 9,014,416 B1 | 4/2015 | Fisher et al. |
| 9,047,568 B1* | 6/2015 | Fisher ................. G06N 3/0472 |
| 9,070,039 B2 | 6/2015 | Richert |
| 9,098,811 B2 | 8/2015 | Petre et al. |
| 9,111,215 B2 | 8/2015 | Piekniewski |
| 9,111,226 B2 | 8/2015 | Richert |
| 9,123,127 B2 | 9/2015 | Richert |
| 9,129,221 B2 | 9/2015 | Piekniewski et al. |
| 9,152,915 B1 | 10/2015 | Gabardos et al. |
| 9,183,493 B2 | 11/2015 | Richert et al. |
| 9,186,793 B1 | 11/2015 | Meier |
| 9,195,903 B2 | 11/2015 | Andreopoulos et al. |
| 9,195,934 B1* | 11/2015 | Hunt ....................... G06N 3/02 |
| 10,133,944 B2 | 11/2018 | Zink et al. |
| 10,229,341 B2 | 3/2019 | Zink et al. |
| 10,235,565 B2 | 3/2019 | Zink et al. |
| 2014/0064609 A1* | 3/2014 | Petre ................... G06K 9/6232 382/159 |
| 2014/0229411 A1* | 8/2014 | Richert ................... G06N 3/08 706/16 |
| 2014/0258195 A1* | 9/2014 | Weng ...................... G06N 3/02 706/19 |
| 2015/0161505 A1 | 6/2015 | Sugioka |

OTHER PUBLICATIONS

Tsang et al.; Neuromorphic Implementation of Active Gaze and Vergence Control; Department of Electronic and Computer Engineering, Hong Kong University of Science and Technology; 2008; pp. 1076-1079.
Brändli; Event-Based Machine Vision; Doctoral Thesis; 2015.
Garcia et al.; pyDVS: An Extensible, Real-time Dynamic Vision Sensor Emulator using Off-the-Shelf Hardware; 2016 IEEE Symposium Series on Computational Intelligence (SSCI); Dec. 6, 2016; pp. 1-7.
Kuhn; Fast MPEG-4 Motion Estimation: Processor Based and Flexible VLSI Implementations; Journal of VLSI Signal Processing Systems for Signal, Image, and Video Technology; Oct. 1, 1999; vol. 23, No. 1; pp. 67-92.
Mueggler et al.; Lifetime Estimation of Events from Dynamic Vision Sensors; 2015 IEEE International Conference on Robotics and Automation (ICRA); IEEE; May 26, 2015; pp. 4874-4881.
Rueckauer et al.; Evaluation of Event-Based Algorithms for Optical Flow with Ground-Truth from Inertial Measurement Sensor; Frontiers in Neuroscience; Apr. 25, 2016; vol. 10, Article 176.
Tschechne et al.; Bio-Inspired Optic Flow from Event-Based Neuromorphic Sensor Input; ECCV 2016 Conference; Oct. 6, 2014; pp. 171-182.
Search Report and Written Opinion for International Patent Application No. PCT/EP2017/083411; dated Mar. 21, 2018.

* cited by examiner

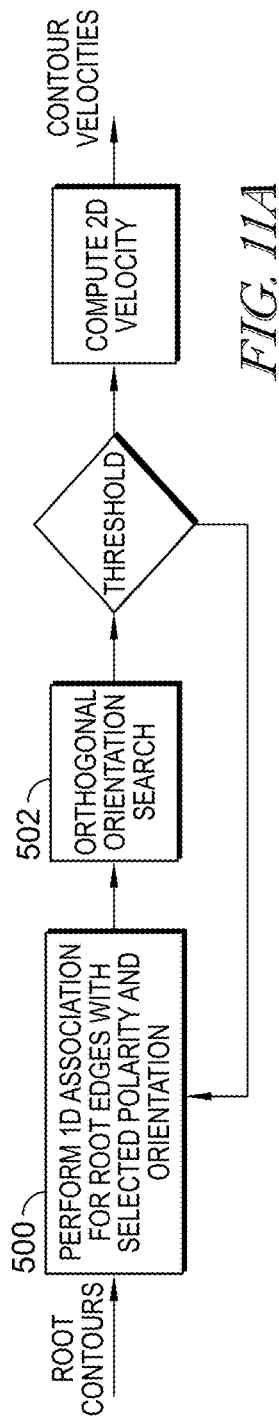
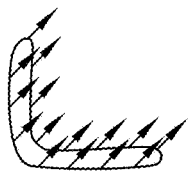
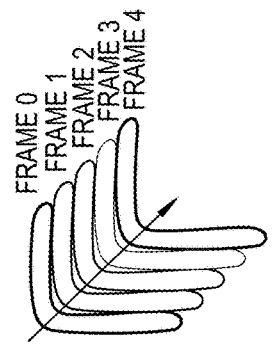
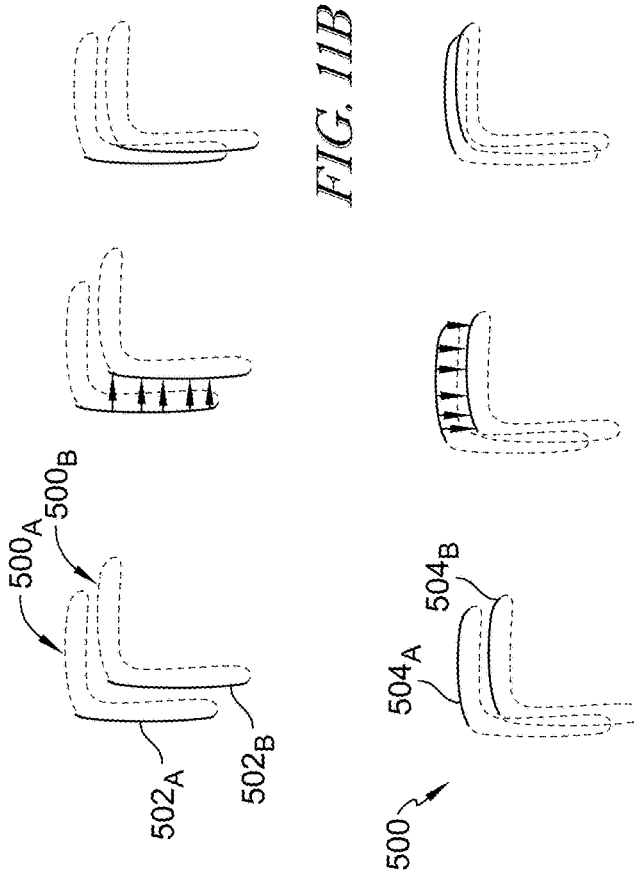
FIG. 11A
FIG. 11B
FIG. 11C

SYSTEM AND METHOD FOR ROOT ASSOCIATION IN IMAGE DATA

CROSS-REFERENCE TO RELATED APPLICATIONS

This application is a continuation-in-part, and claims priority to and the benefit of, the prior filed non-provisional U.S. patent application Ser. No. 15/386,220, filed Dec. 21, 2016, the contents of which are incorporated herein by reference in their entirety, and at least including those portions directed to neuromorphic image data collection and use.

COPYRIGHT

One or more portions of the disclosure, alone and/or in combination, of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

The present disclosure relates to systems, components, and methodologies for image processing. In particular, the present disclosure relates to systems, components, and methodologies that perform image processing for using digital NeuroMorphic (NM) vision techniques.

SUMMARY

According to the present disclosure, systems, components, and methodologies are provided for NM-based image data generation, image data processing and subsequent use to detect and/or identify objects and object movement in such image data for assistance, automation, control and/or documentation.

In accordance with disclosed embodiments, structure and software are provided for simulation of conventional analog NM system functionality using a digital NM vision system that incorporates at least one detector that includes one or more NM sensors, a digital retina implemented using, for example, CMOS technology that enables generation of digital NM data for image data processing by a digital NM engine that facilitates improved object detection, classification, and tracking. As such, exemplary embodiments are directed to structure and software that may simulate analog NM system functionality.

In accordance with at least one embodiment, the digital NM engine may include a combination of one or more detectors and one or more processors running software on back-end to generate digital NM output.

In accordance with at least one embodiment, the digital NM vision system, its components and utilized methodologies may be used to compress high framerate video data by performing feature extraction close to an imaging sensor to generate an encoded version of image data that includes differences and surrounding spatio-temporal regions for subsequent image processing. Thus, in accordance with at least one embodiment, the hardware and methodologies may be utilized as an effective method for compressing high framerate video, e.g., by analyzing image data to compress the data by capturing differences between a current frame and a one or more previous frames and applying a transformation.

In accordance with at least one embodiment, the digital NM vision system and/or at least a subset of its components may be incorporated in a stereo neuromorphic pair. In accordance with at least one implementation, components of the digital NM vision system may be incorporated in a compound camera. In such an implementation, the computational element of each imaging sensor may be coupled to other computational elements of other imaging sensors, e.g., adjacent sensors or other types of sensors, to collaborate with other computational elements to provide functionality. For example, in accordance with at least one implementation, the digital NM vision system components may be incorporated in an event-based camera.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 11A is a block diagram of a process of 2D contour velocity determination based on multiple 1D root associations in various orientations provided in accordance with at least one embodiment;

FIG. 11B is a graphical depiction of the process of 2D contour velocity determination of FIG. 11A of an edge of the L-shaped contour provided in accordance with at least one embodiment;

FIG. 11C is a graphical depiction of the process of 2D contour velocity determination of FIG. 11A of another edge of the L-shaped contour provided in accordance with at least one embodiment;

DETAILED DESCRIPTION

Figure 1:
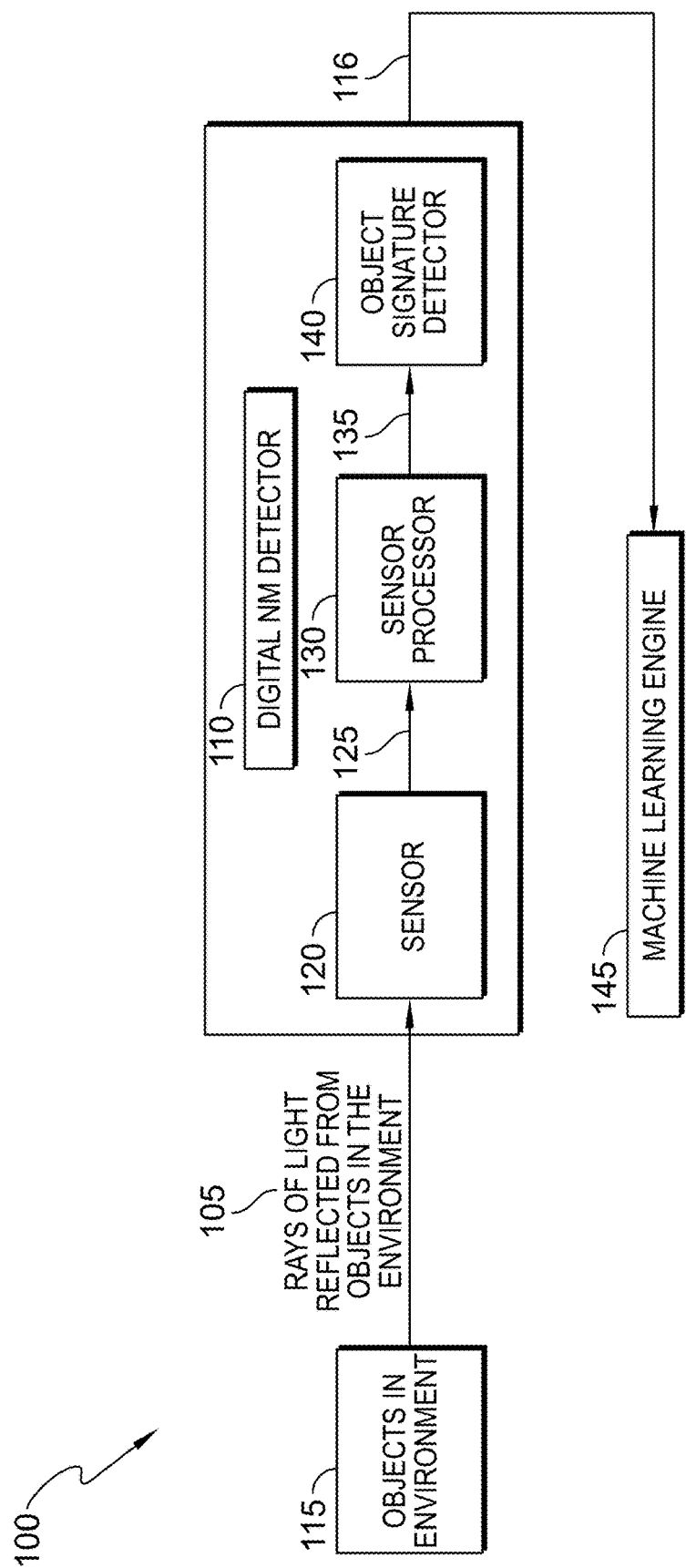
FIG. 1 is an illustrative diagram of hardware structure and software utilized by disclosed embodiments to provide simulation of conventional, human eye, analog NM system functionality including generating shapelet data from image data to assist in defining objects.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Video image data analysis and processing for use in, for example, automated vehicle operation can consume considerable computational resources. Commercially available image detection and processing equipment routinely use solid-state detectors to capture large numbers of frames each second. By displaying those images at high speed, the viewer has the illusion of motion. This is the basis of recorded video images.

However, when such video data is analyzed by computers running image processing and/or analysis software, the large number of frames used to give the impression of motion can overwhelm the computational capability of the computers. This is because a high frame rate video may provide so much data that the computer is incapable of analyzing the data because the data is changing too quickly. Conventionally, efforts have been made to increase the ability for image processing by increasing the processing speed of processors analyzing the image data.

Additionally, analog-based Neuromorphic (NM) vision systems, device, and methods may use techniques that mimic or simulate the human eye's ability to concentrate on more important image data. NM processing is based on the idea that it is not necessary to analyze all of the data included in a video image. Rather, NM system can prioritize analysis to focus on changes that occur in the image data, while de-prioritizing analysis of the image data that remains generally the same between frames. Such prioritization can reliably reduce the total data for processing in certain instances where non-changing data may be redundant and/or less significant.

More specifically, processors and software can economize the otherwise labor intensive image processing by capturing and identifying image data of interest, spatial and temporal changes, and outputting that data for use in various aspects of image processing, automation and assistive control, analysis and diagnostic systems utilizing image processing. This economization can be instituted by tracking and/or recording amplitude changes in the data exceeding a particular threshold. In illustrative embodiments, pixel amplitudes above a prescribed threshold can indicate a relevant change in image data within a sub-section of the overall image. Accordingly, changes in image data which do not exceed a threshold can be more reliably deprioritized.

However, in analog NM systems, such economization can provide high effective frame rates but may be limited in spatial image sizes and spatial resolutions due to the constraints and costs of analog processing embedded into each pixel of the imager. Thus, analog NM systems may not effectively achieve real-time image utilization.

The presently disclosed embodiments can provide devices, systems, and methods for economized NM image detection, processing, and use. Economized image detection and processing can enable economized feature extraction from objects within the images. Such economized feature extraction can increase the accuracy and throughput of vision devices, systems, and methods, such as NM vision systems.

In illustrative embodiments, an example of which being illustrated in FIG. 1, structure and software are provided for a NM system 100. The NM system 100 is illustratively embodied as a digital NM system including a digital NM detector 110 for detecting images and performing at least certain portions of object recognition operations as discussed herein. The NM detector 110 illustratively includes a sensor 120, embodied to include at least one photoreceptor, for receiving light 105 from an object 115 with the field of the view of the sensor 120 and converting the light 105 into image data 125.

As shown in FIG. 1, the NM detector 110 illustrative includes a digital retina 130 for providing shapelet data 135 based on the image data 125, and an object signature detector 140 for extracting features of the object 115 from the shapelet data 135. As discussed in additional detail below, shapelet data 135 illustratively includes image data economized for vision processing. The digital retina 130 may be illustratively embodied as a sensor processor implemented, for example, using complementary metal-oxide-semiconductor (CMOS) technology, e.g., one or more Field Programmable Gate Arrays (FPGAs), (GPUs) and/or functionally and/or structurally similar devices, integrated circuits, and/or associated software and/or firmware provided in, for example, Application Specific Integrated Circuits (ASICs). The digital retina 130 may process the image data 125 to provide shapelet data 135 to the object signature detector 140 for extraction of object features and/or generating of object signatures 116 based on the extracted features. As shown FIG. 1, the object signatures 116 may be provided to a NM learning engine 145 for further analysis and/or processing. As discussed in additional detail herein, according to illustrative embodiments, object features and/or signatures can be achieved by identifying and associating various location points (herein, referred to as "roots") associated with the image data 125.

Extracting object features and/or generating object signatures 116 can increase accuracy and/or precision in tracking objects within the field of view. For example, analyzing object features and/or signatures 116 across time (i.e., across multiple image frames) can assist in identifying the particular aspects of the object 115 and distinguishing the object 115 from other things within the image, for example, background objects and/or optical illusions. Moreover, conducting such object detection using one or more economized data techniques disclosed herein can reduce processing burden and/or increase accuracy and precision of vision implementations.

Referring again to FIG. 1, the shapelet data 135 generated by the digital retina 130 based on the image data 125 may include the economized image data, which can include any suitable targeted economization of the image data, and may include light intensity data, and/or data derivable therefrom using image processing and data processing techniques explained herein (e.g., "spikes," "roots", "blobs" and associated data). More specifically, in at least one embodiment, the digital retina 130 illustratively includes digital circuitry that generates spike data indicative of a "spike" associated with a particular photoreceptor of the sensor 120 whenever the light intensity value measured by that particular photo receptor exceeds a threshold. In this example, the digital retina 130 generates spike data not only based on the value measured by that particular photoreceptor 120 but also in consideration of measurements of other photo receptors 120 in close proximity to the particular photoreceptor 120, for example but without limitation, one photoreceptor away. In illustrative embodiments, spike data generated in the digital retina 130 can be used to provide (i.e., define, identify, generate, and/or otherwise establish) other economized image data, for example, roots, blobs, and/or other image processing data based on the image data 125, which are all referred to collectively and individually as "shapelet data."

In accordance with disclosed embodiments, two dimensional root association may be performed, which requires generation of shapelet data 135 that may include blobs, roots and spikes along an orientation and associating the roots. In the illustrative embodiments, shapelet data 135 is generally described with reference to roots as location points of the image data 125 (but as previously mentioned, shapelet data may include an variety of economized image data). As opposed to spikes (light intensity amplitudes), roots tend to be consistent across space (multiple cameras) and time (multiple frames). Roots can be linked or associated umabiguously with each other to enable extraction of contours related to the image data and preferably related to the object 115. The extracted contours can be used to discern object motion within the field of view.

Figure 2A:
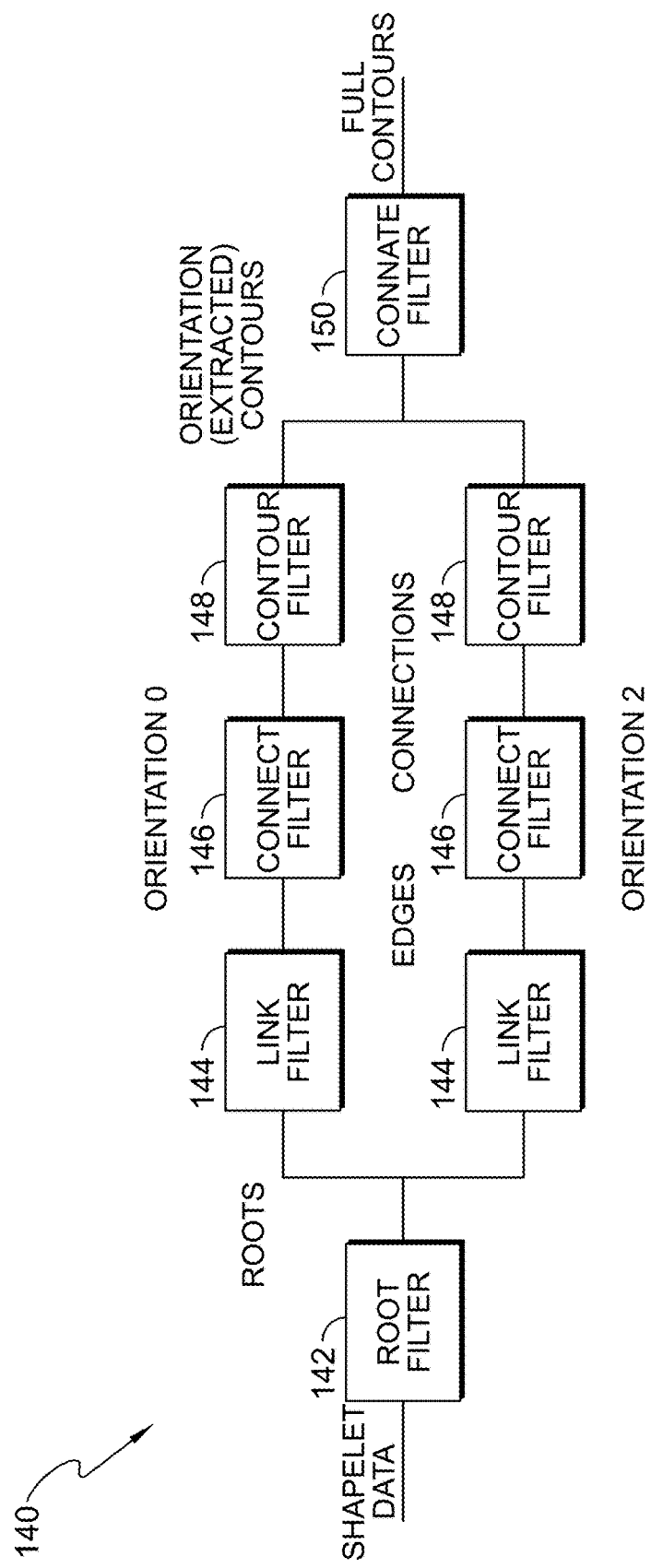
FIG. 2A is a block diagram of an illustrative arrangement of filters and/or operations use to provide the simulation of object definition from shapelet data provided in accordance with at least one embodiment.

As illustrated in FIG. 2A, shapelet data 135 may include roots identified from a sparsity image (discussed below with respect to FIG. 3A). The sparsity image may be generated by application of a center surround filter to the image data 125 to produce/define root functions and associated dead zones between the roots. From the sparsity image, zero-crossings can be determined as "roots" having either positive or negative polarity.

In accordance with at least one disclosed embodiment, the spike data may be augmented or used in combination with image data generated by filtering incoming image data using a color opposite adaptive threshold. In such an implementation, the use of center surround filters (much like center-surround receptive fields in the retina of an eye) may be used to generate image data that enables generation of zero-crossings, i.e., roots. Such capabilities provide particular advantages alone, and when combined with the other functionality described herein, because they enable the ability to use the zero-crossing data to identify and utilize root polynomial data so as to attain sub-pixel accuracy.

Referring now to FIG. 2A, object signature determinations may be described in terms of the block diagram as an illustrative arrangement of filters and/or operations of object signature detector 140. A root filter 142 may, for example, output roots based on input shapelet data 135. Accordingly, output roots may be generated based on particular orientations, e.g., orientations 0, 2 (as discussed in additional detail below, relative to FIG. 10) and may incur analysis through link filters 144, connect filters 146, contour filters 148, each applying operations described below to result in orientation contours. Multiple orientation contours can optionally be used to generate full contours by application of a connate filter 150. The root filter 142 may be used to map the shapelet data 135 (and namely the sparsity image in this example) along each particular orientation to identify roots corresponding to each particular orientation.

Figure 2B:
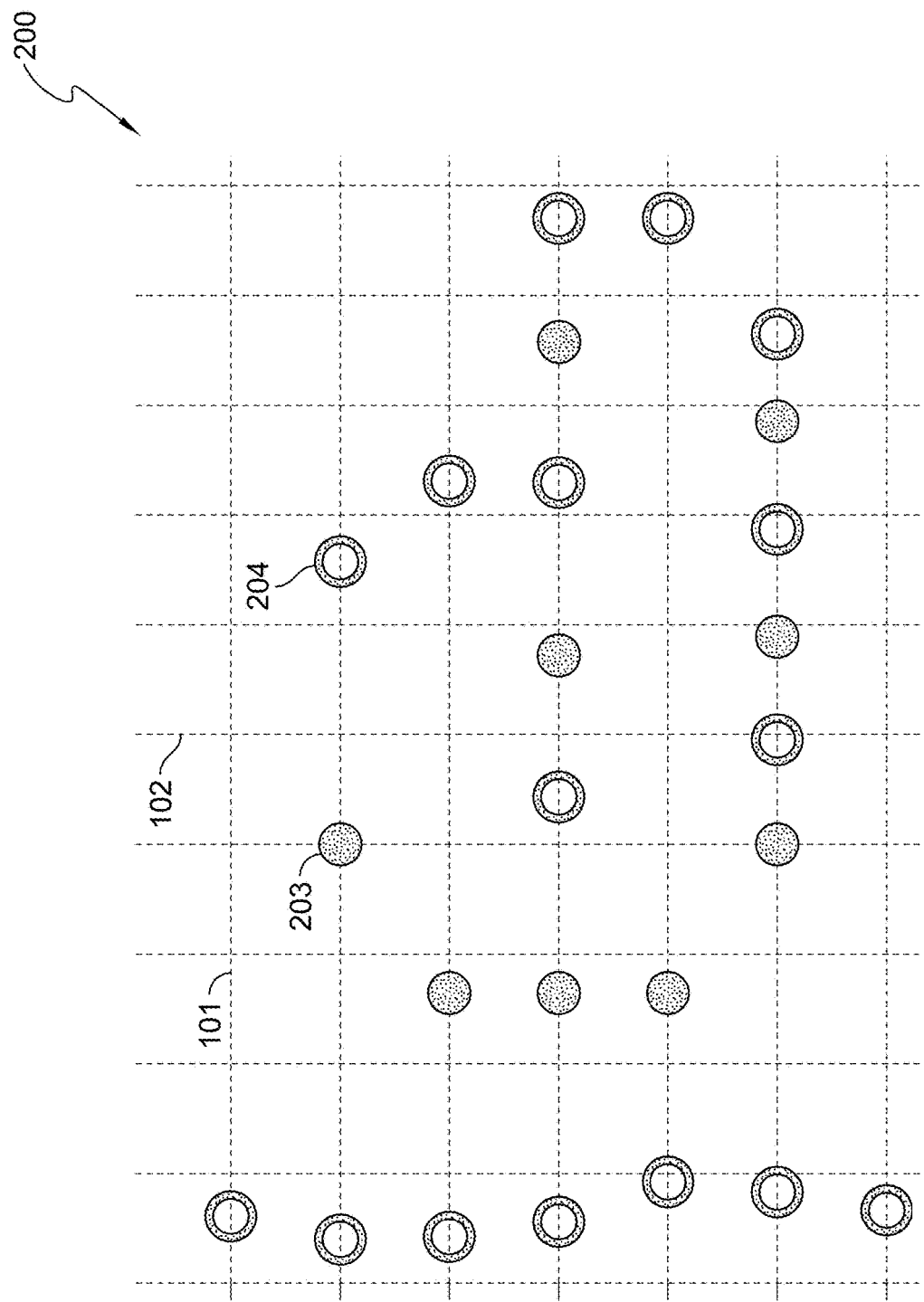
FIG. 2B is an exemplary plot of a number of roots identified from shapelet data according to a coordinate system and showing that a reference orientation is disposed along the horizontal axis in accordance with at least one embodiment.

As shown in FIG. 2B, an example of a number of roots 200 identified in one orientation are plotted on a Cartesian coordinate system having horizontal and vertical axes. The horizontal axis includes intervals spaced apart from each other vertically and defined by horizontal lines 101, and the vertical axis includes intervals spaced apart from each other horizontally and defined by vertical lines 102. In the illustrative embodiment, the plot in FIG. 2B is embodied as formed in the 0 orientation, which, in this example, is taken along the horizontal (see FIG. 10). For orientation 0, the horizontal lines 101 represent the rows of the image and the vertical lines 102 represent the columns of the image. In the illustrative embodiment, in 0 orientation, the vertical lines 102 illustratively represent non-orientation intervals of pixel boundaries of adjacent pixels of the sensor 120 and the horizontal lines 101 represent orientation interval of eight times pixel resolution ($\frac{1}{8}^{th}$ pixel width). In accordance with at least some embodiments, any denomination of intervals may be used with corresponding correction in upstream and downstream process as required.

In FIG. 2B, positive roots (e.g., root 203) are represented by solid circles, while negative roots (e.g., 204) are represented by hollow circles. Notably, because the root mapping is performed along this orientation direction, each root 200 is defined as an interval of its orientation direction (in this example, on the horizontal lines 101 corresponding to orientation 0) and the polarity of the roots 200 alternates while advancing along the orientation intervals (again, along the lines 101). Spacing of the roots along each orientation intervals is greater than 1 pixel; otherwise, roots can lie anywhere along the orientation lines.

Figure 2C:
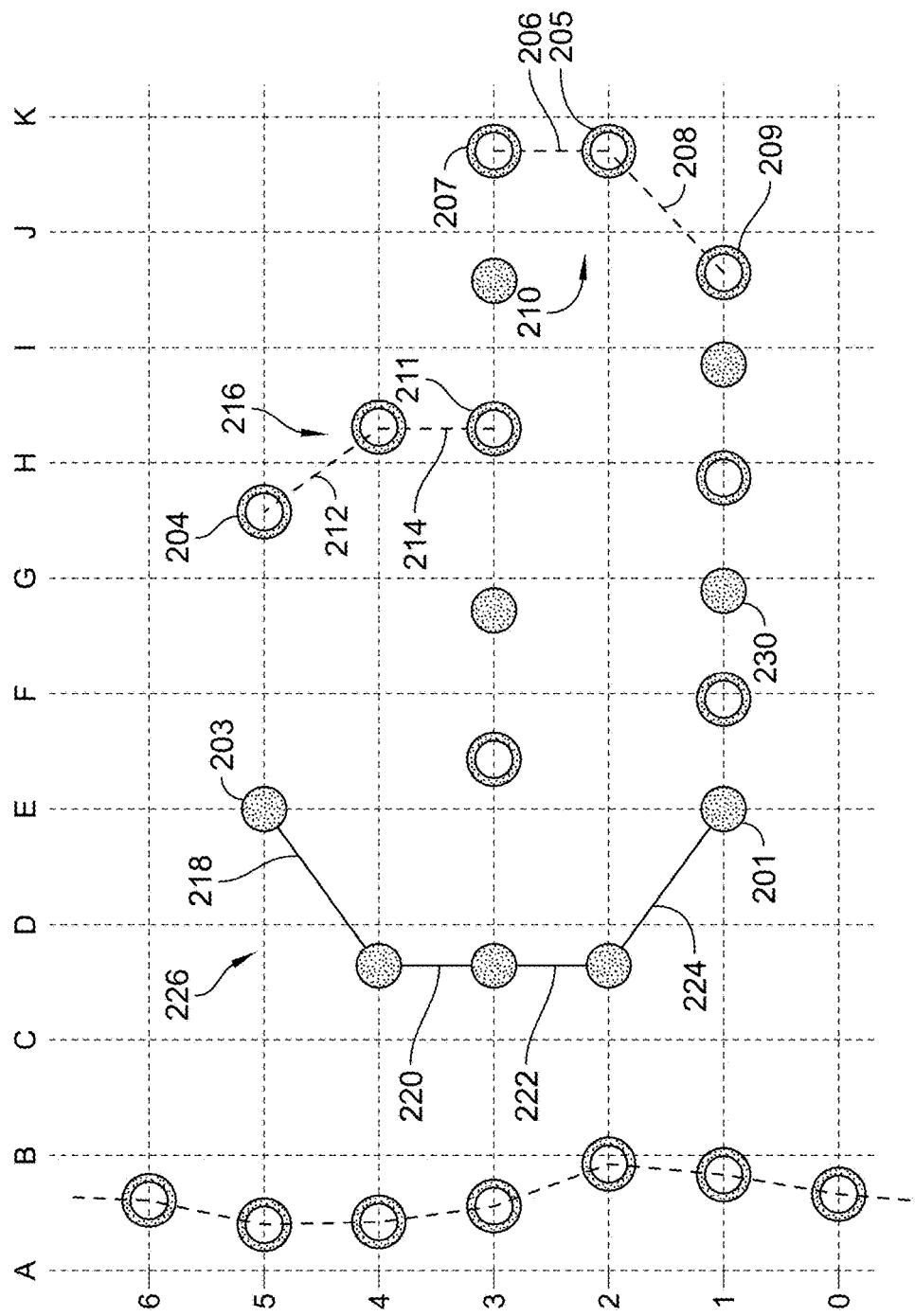
FIG. 2C is an example of an application of a link filter for linking together roots which are disposed on adjacent horizontal plot lines to form edges, and showing that roots of similar polarity can be linked in accordance with at least one embodiment.

Turning now to FIG. 2C, the operations of the link filters 144 may include linking together roots having common polarity. In particular, the link filters 144 may perform linking between roots on adjacent orientation intervals (e.g., horizontal lines 101, for orientation 0), according to link profiles to form edges. For example, roots 205, 207, 209 may be linked together to form edge 210. Root 205 may link to root 207 by a previous link 206 and link to root 209 by a next link 208. Accordingly, root 205 may be considered or classified as an edge link having both previous and next links, while roots 207, 209 may be considered or classified as end links having only one of a previous or next link, namely top-end and bottom-end roots, respectively. Roots having no links, such as root 230, may be considered or classified as dot roots. As previously mentioned, linking between roots may be determined according to link profiles.

Figure 2D:
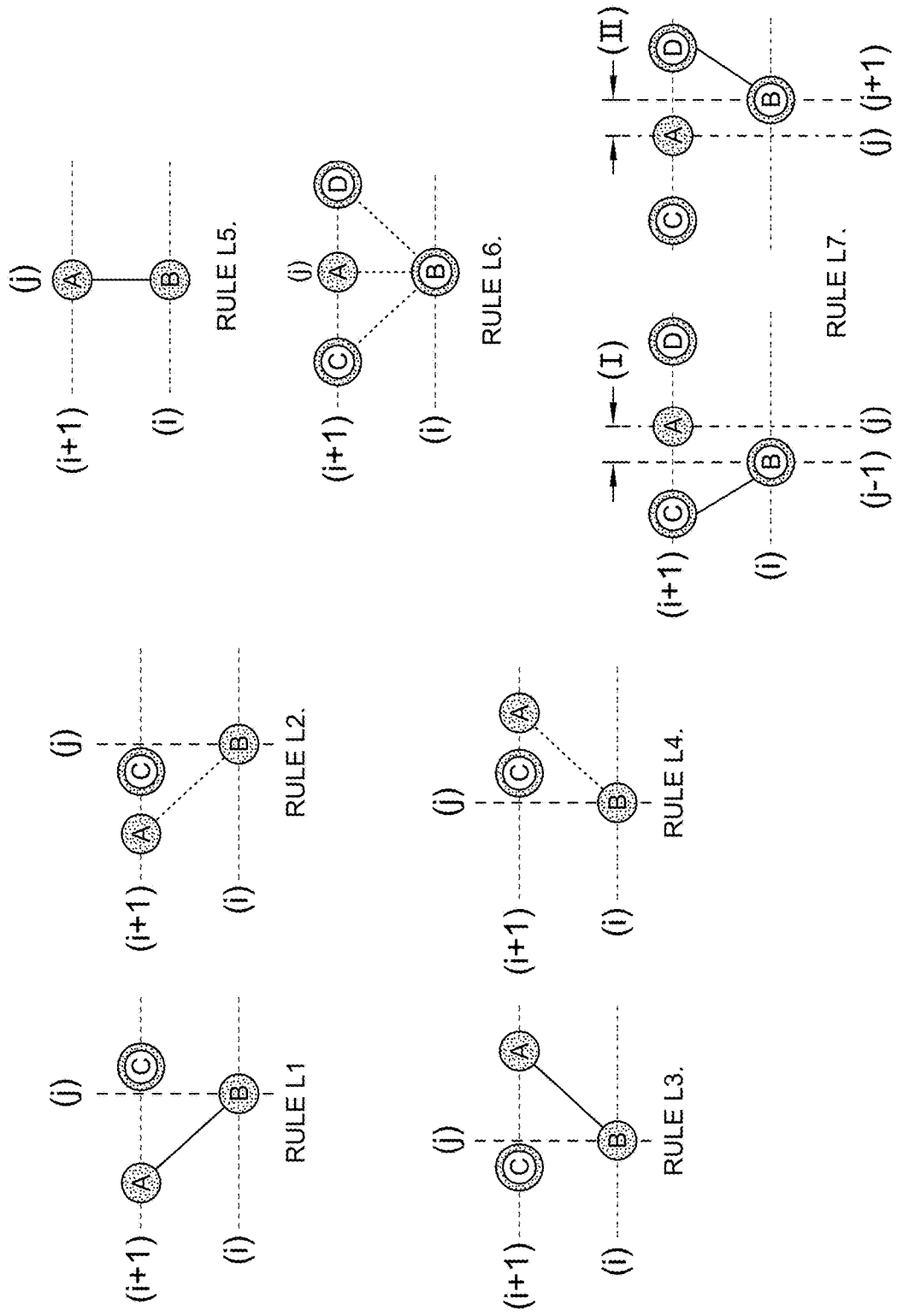
FIG. 2D is a diagram of predetermined link profiles embodied as a number of linking rules that can define the conditions for linking together roots to form edges in accordance with at least one embodiment.

As shown in FIG. 2D, link profiles may include a set of linking rules against which relative root positions may be evaluated to determine whether a link should properly be formed. In the illustrative embodiment, link profiles are embodied as linking rules L1-L7 with reference to generic roots A, B, C, D. With reference to Rule L1, positive root B is positioned on horizontal line i at position (i, j). Of note, horizontal lines i and i+1 are orientation intervals because roots A, B, C lie thereon, while vertical line j does not necessarily have to correspond to a non-orientation interval (not necessarily lines 102 in FIG. 2C). In Rule L1, positive root B is linked to positive root A that is located on adjacent horizontal line i+1. Rule L1 specifies that positive roots A and B are linked because negative root C on line i+1 is not located between the vertical line j and root A. Conversely, as in Rule L2, root C is located along horizontal line i+1 between the vertical line j and root A, and consequently linking between roots A and B is not permitted. In the illustrative embodiment, Rule L3 is similar to Rule L1 but with mirror image to link roots A and B, and Rule L4 is similar to Rule L2 but with mirror image to prevent link between roots A and B. In Rule L5, root A is illustratively arranged directly above root B and each have the same polarity. Accordingly, roots A and B are linked.

In Rules L6 and L7, a variance is addressed. In Rule L6, root A is directly above root B and has opposite polarity therefrom. Roots C and D have common polarity with root B, but linking with either C or D would cause inconsistency with Rules L1-L4 (neither rule applies perfectly). Thus, on occurrence of Rule L6, a correction may be applied, wherein Rule L7 is followed. In the illustrative embodiment, the correction applied on occurrence of Rule L6 is to (artificially) shift the position of root B by 1 pixel to either the left (I) or right (II) along the horizontal line i to a position j±1. The result is that root C, which has non-common polarity with root B, remains at position j and thus conforms with either of Rule L1 to link roots B and C (Rule 7LI), or, with Rule L3 to link roots B and D (Rule L7II). Accordingly, the link profiles provide guidance for linking together the roots to form edges. In the illustrative embodiment, the edges thus formed may be unambiguously defined, having no ambiguities other than that corrected in Rule L6 and L7.

Figure 2E:
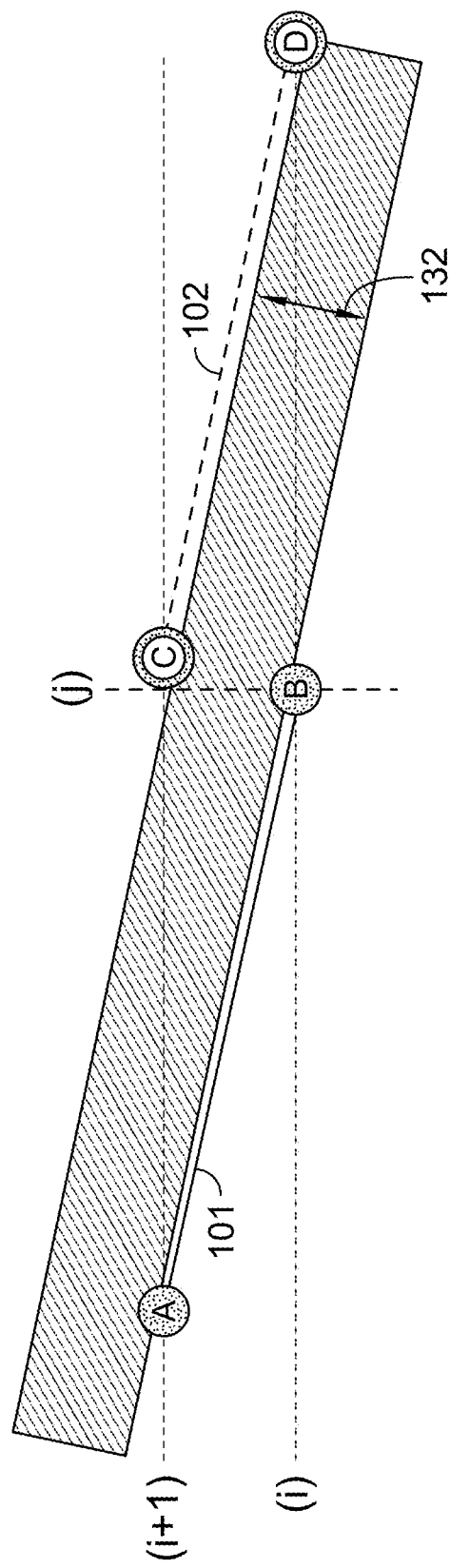
FIG. 2E is an illustrative example of spacing conditions of linked roots provided in accordance with at least one embodiment.

As shown in FIG. 2E, the illustrative link profiles operate to define certain spatial-geometric relationships between roots. For example, roots A and B of a first polarity may be linked and roots C and D of the other polarity may be linked. As previously mentioned regarding orientation 0, horizontal lines i and i+1 may be spaced apart by 1 pixel width. Moreover, the link between roots A and B conforms with Rule L1 having root C positioned to the right of root B (vertical line j). Accordingly, a minimum distance between roots B and C may be 1 pixel width (or technically, slightly greater than 1 pixel width) as a dead-zone 132.

Figure 2F:
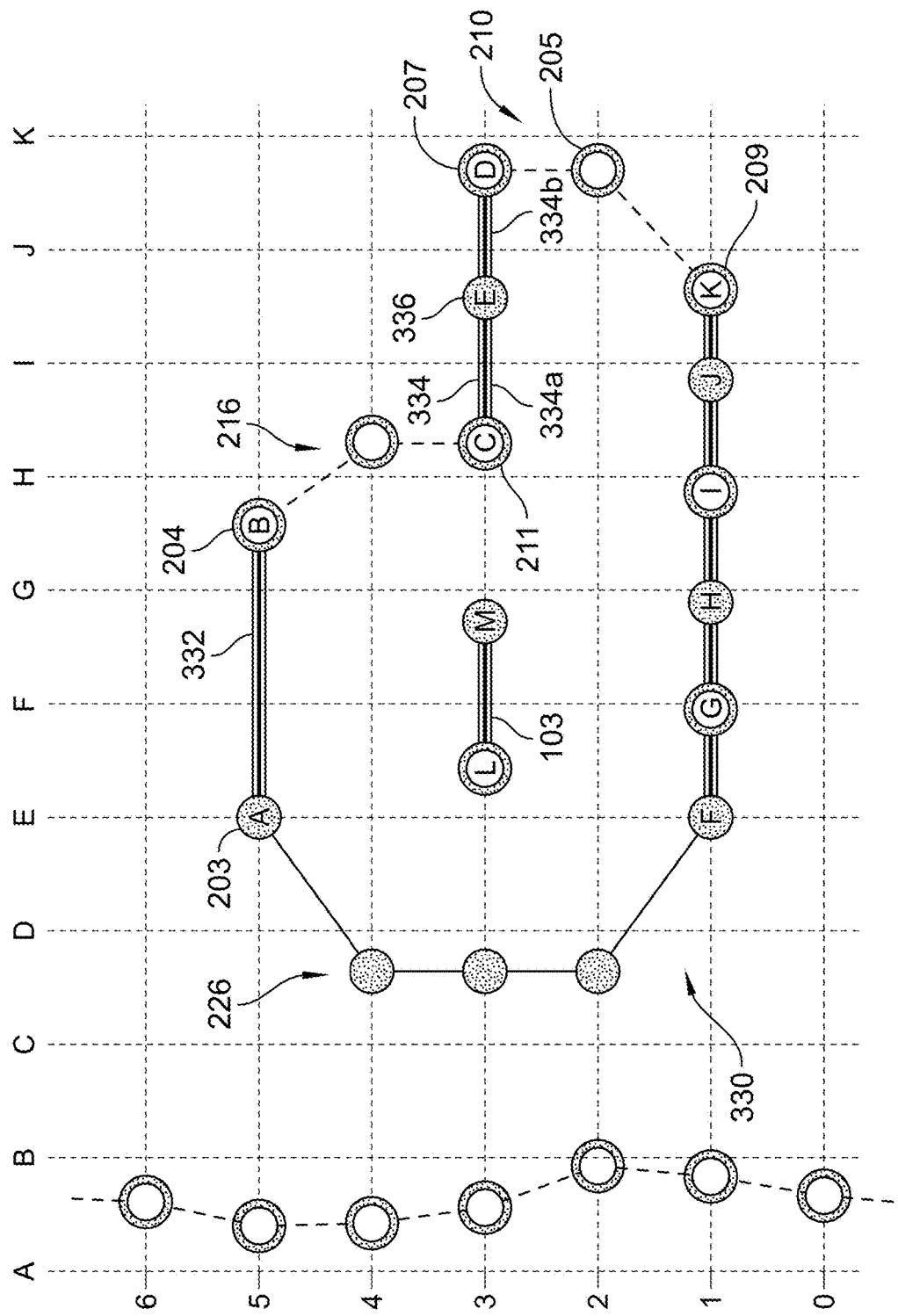
FIG. 2F is an example of an application of a connect filter for connecting together roots of edges lying on the same horizontal plot line provided in accordance with at least one embodiment.

FIG. 2F illustrates a depiction of connections formed between edges, for example, edges 210, 216, 226, which can be connected together to establish contours. Edges may be generally connected at their end roots and only to other ends roots lying on the same orientation line. For example, in orientation 0, end roots 203 and 204 are end roots of respective edges 216, 226 and lie on the same horizontal line 5. End roots 203 and 204 are connected together by connection 332. As another example, in orientation 0, end roots 207, 211 of respective edges 216, 210 are connected together by connection 334 comprising sub-connections 334a, 334b between each of the end roots 207, 211 and dot root 336. Connections are formed according to connection profiles.

Figure 2G:
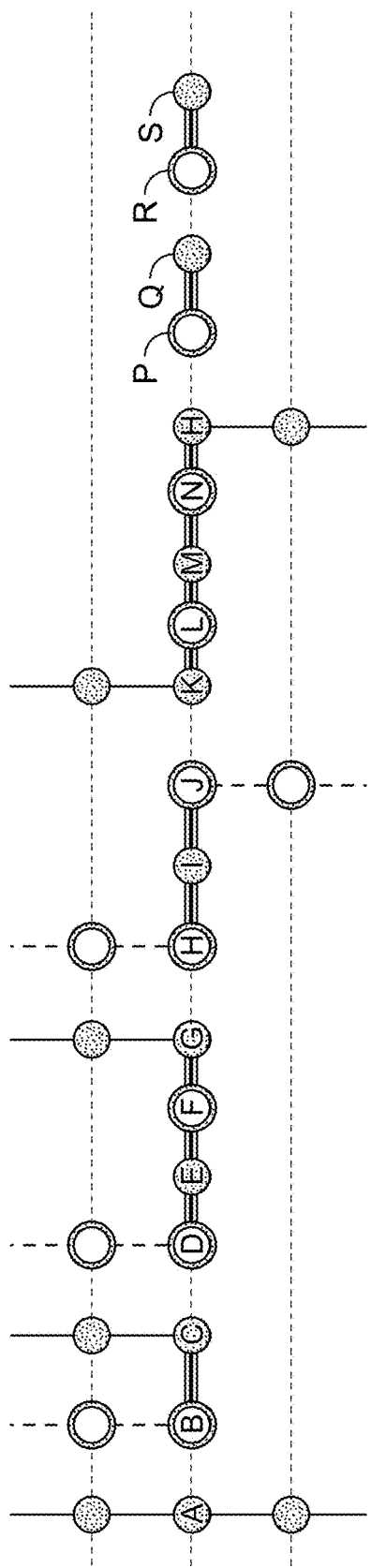
FIG. 2G is a diagram of predetermined connection profiles embodied as a number of connecting rules that can define the conditions for connecting together edges, and showing that together the connected edges can form contours provided in accordance with at least one embodiment.

FIG. 2G illustrates a set of exemplary connections based on various types of roots. Notably, root A (left) has no connection because it is an edge root, not an end root. Proceeding to the right, root B is an end root of one edge connected to end root C of another edge. Similarly, end root D is connected to end root G of another edge via two dot roots E and F. Of note, each of connected roots B, C are both bottom-end roots having opposite polarities from each other, and likewise each of connected roots D, G are bottom-end roots having opposite polarities from each other. Bottom end roots having opposite polarities can be connected only by one of zero or an even number of dot roots (e.g., two dot roots).

Advancing to the right in FIG. 2G, the end root H of one edge may be connected to end root J of another edge via dot root I. Notably, end root H is a bottom-end root while end root J is a top-end root, and their connection together requires an odd number of dot roots, here a single dot root I. Similarly, bottom-end root K and top end root H are connected by three dot roots L, M, N. Moving rightward, remaining dot roots, not participating in a connection between end roots, can connect with each other. For example, dot roots P and Q may be connected, and dot roots R and S may be connected. Accordingly, connections may be applied along an orientation direction (here, left-to-right or right-to-left) and beginning from an edge.

Returning briefly to FIG. 2F, an example of application of root profiles, linking profiles and connection profiles is provided. Edges 210, 216, 226 may be formed and connected to define contours, such as contour 330. As illustrated, the contours are perfect contours, such that they are formed without ambiguity (with the exception of that resolved under Rules L6 and L7, discussed above).

Returning again to FIGS. 2A and 2F, the contour filter 148 may trace edges and connections until either the contour returns to the starting root or the contour leaves the image. The traced contour 330 that is outputted from the contour filter 148 is illustratively formed for the orientation 0 and may constitute an orientation contour.

Figure 3A:
FIG. 3A is an illustrative depiction of roots identified within a field of vision (in this instance, within a frame) provided in accordance with at least one embodiment.
Figure 3B:
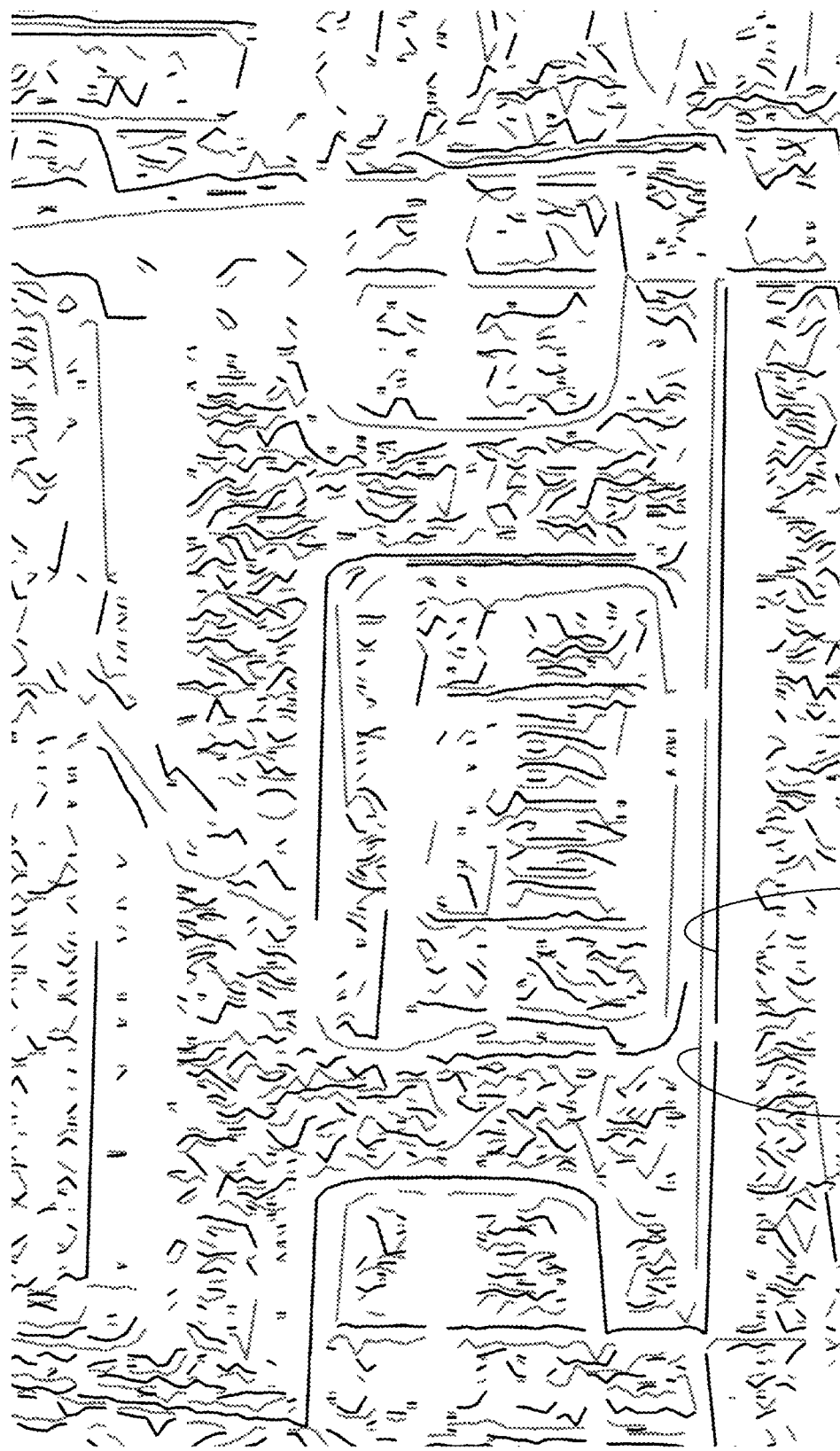
FIG. 3B is an illustrative depiction of the edges formed by the roots within field of view of FIG. 3A provided in accordance with at least one embodiment.
Figure 3C:
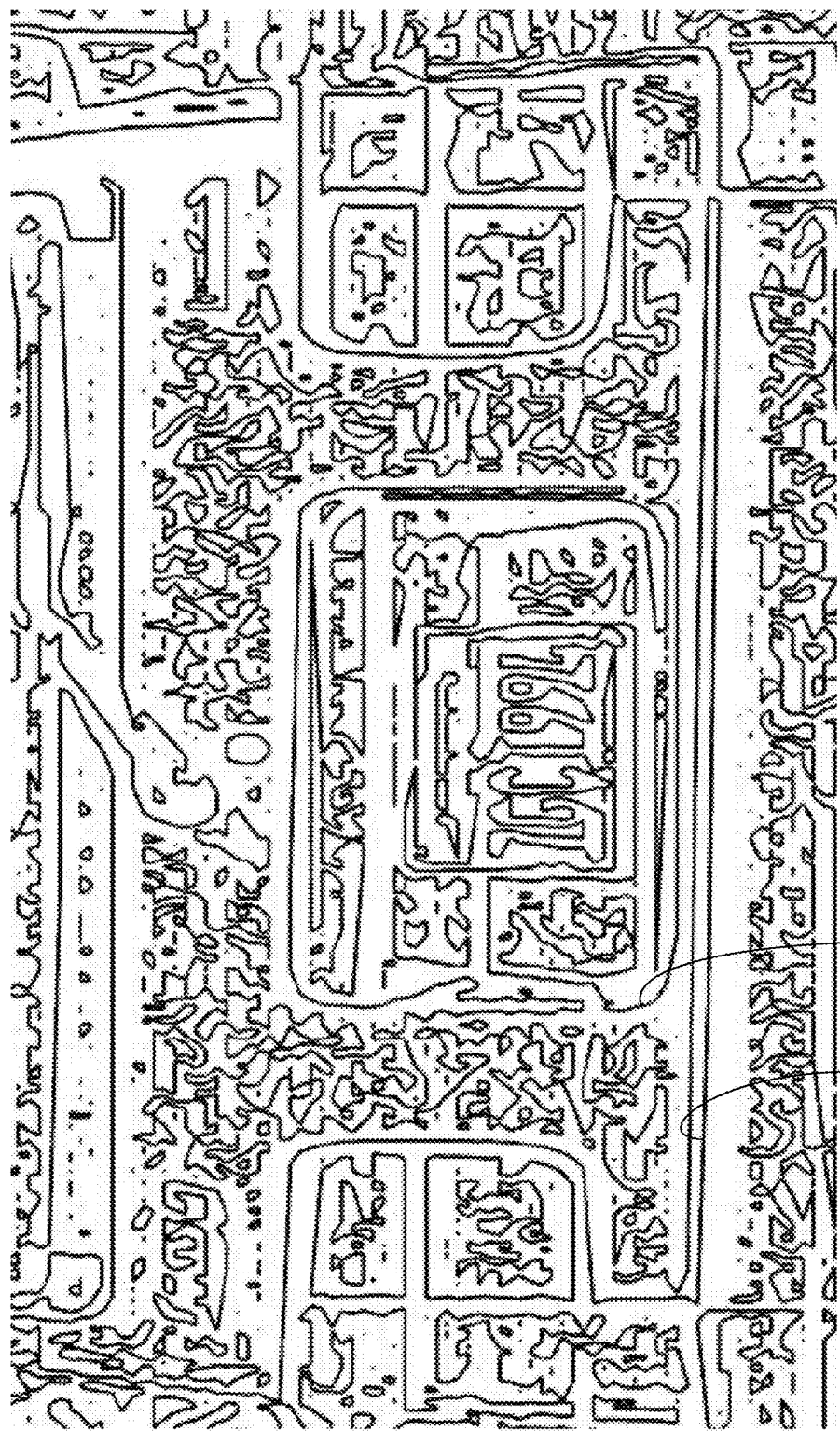
FIG. 3C is an illustrative depiction of contours formed by connecting edges within the view of view of FIGS. 3A and 3B provided in accordance with at least one embodiment.
Figure 3D:
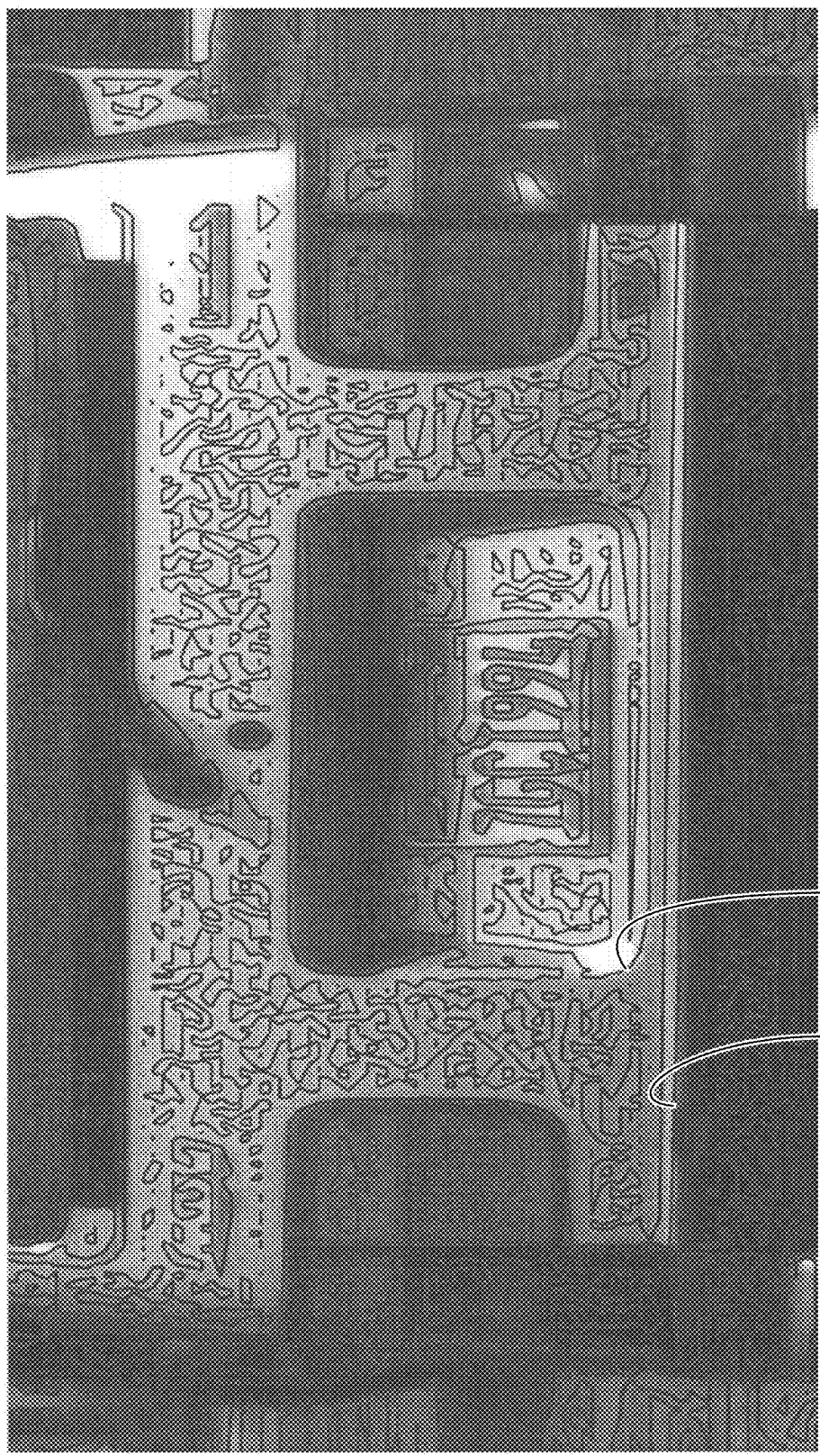
FIG. 3D is the illustrative depiction of contours from FIG. 3C overlaid on a source image of the field of view within FIGS. 3A, 3B, and 3C provided in accordance with at least one embodiment.

Referring now to FIGS. 3A-3D, the formation of contours is discussed with example data images. In FIG. 3A, an example sparsity image is shown having various positive roots 350 (darker/solid dots) and negative roots 352 (lighter/hollow dots). In FIG. 3B, the roots have been linked according to the link profiles to form edges, such as edges 354 (positive, lighter/hollow curves) and 356 (negative, darker/solid curves). As shown in FIG. 3C, the edges have been connected according to the connection profiles to form contours, such as contours 358, 360. In FIG. 3D, the contours of FIG. 3C, including contours 358, 360 have been overlaid on to a source image of a rear portion of a vehicle to illustrate that the contours, thus formed, relate to the image. Accordingly, object information, such as contouring, can be reliably determined from image data.

Figure 4:
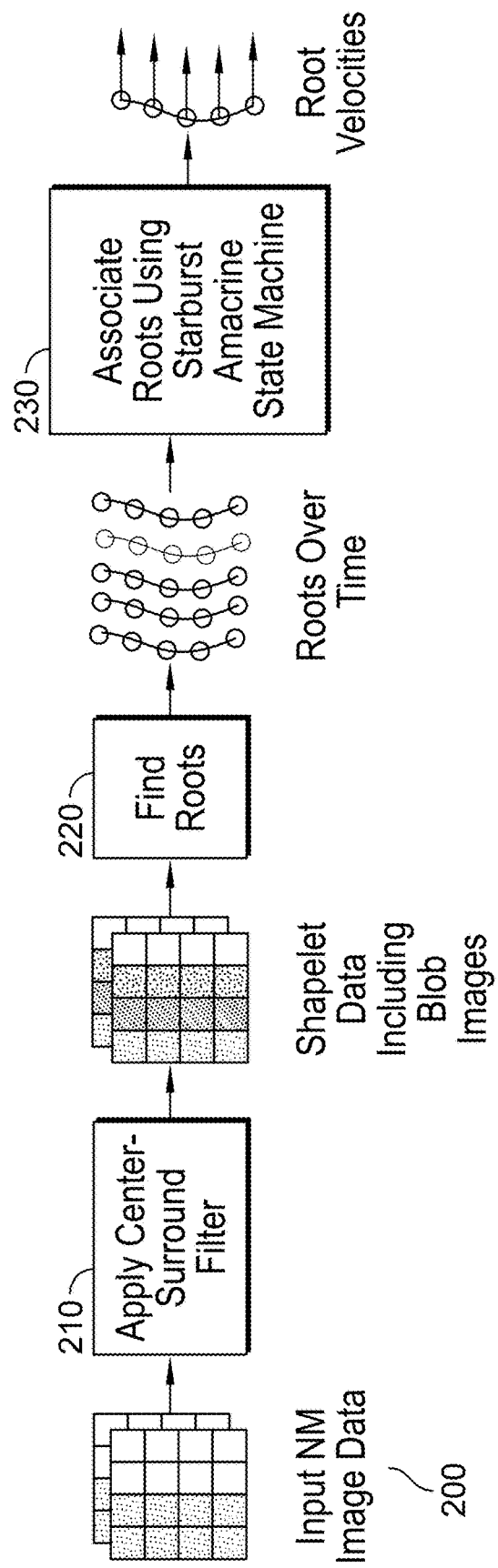
FIG. 4 is an flow diagram showing a determination of contour velocities provided in accordance with at least one embodiment.

Referring now to FIG. 4, a sequence diagram illustrates an exemplary one-dimensional (1D) velocity determination from image data. Determining velocities of reference information within image data can enable accurate object recognition, assist in tracking objects through movement, assist in distinguishing relevant optical information from less relevant and/or illusory information, and provide a basis for further complex and/or sophisticated handling of information for later use.

At 200, image data may be received as an input. Control then proceeds to 210, at which a center-surround filter is applied to the image data to produce shapelet data (shown as spike data, but which may include any of spikes, roots, blobs, and/or associated data). Control then proceeds to 220, at which roots are identified as disclosed herein. Control then proceeds to 230, at which roots may then be associated across time, for example, using a Starburst Amacrine state-machine to compute 1D root velocities. Accordingly, 1D velocities can be determined from the image data.

Referring to FIGS. 5-7B, a two-dimensional (2D) root velocity can be determined based on determination of 1D root velocities along multiple orientations while simultaneously shifting the reference space-time along an axis orthogonal to the orientation axis.

Figure 5:
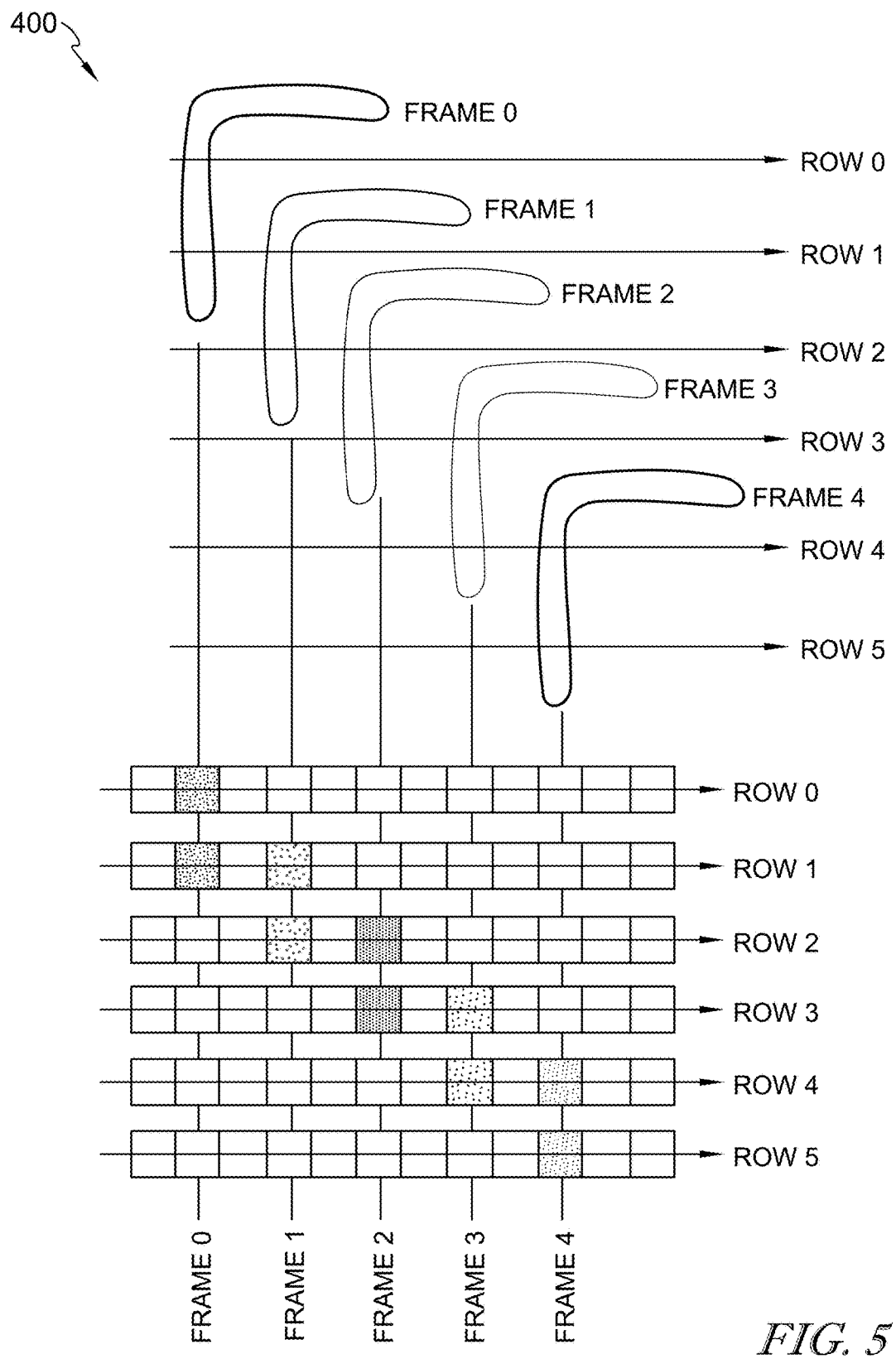
FIG. 5 is an exemplary depiction of a L-shaped contour moving two pixels to the left and one pixel down over a series of frames provided in accordance with at least one embodiment.

FIG. 5 illustrates an example of a contour 400 of an L-shaped object across multiple image frames 0-4, wherein each frame represents an image capture point in time. Throughout the frames 0-4, the L-shaped object is moving two pixels to the left and one pixel down (in the orientation as shown in FIG. 5). Accordingly, the 2D velocity may be represented as $v_x=2$ and $v_y=1$, assuming a upper-left origin and the x-axis pointing right and the y-axis pointing down. However, computing the 1D velocity for orientation 0 fails because the objects along the arrows do not line up.

Figure 6:
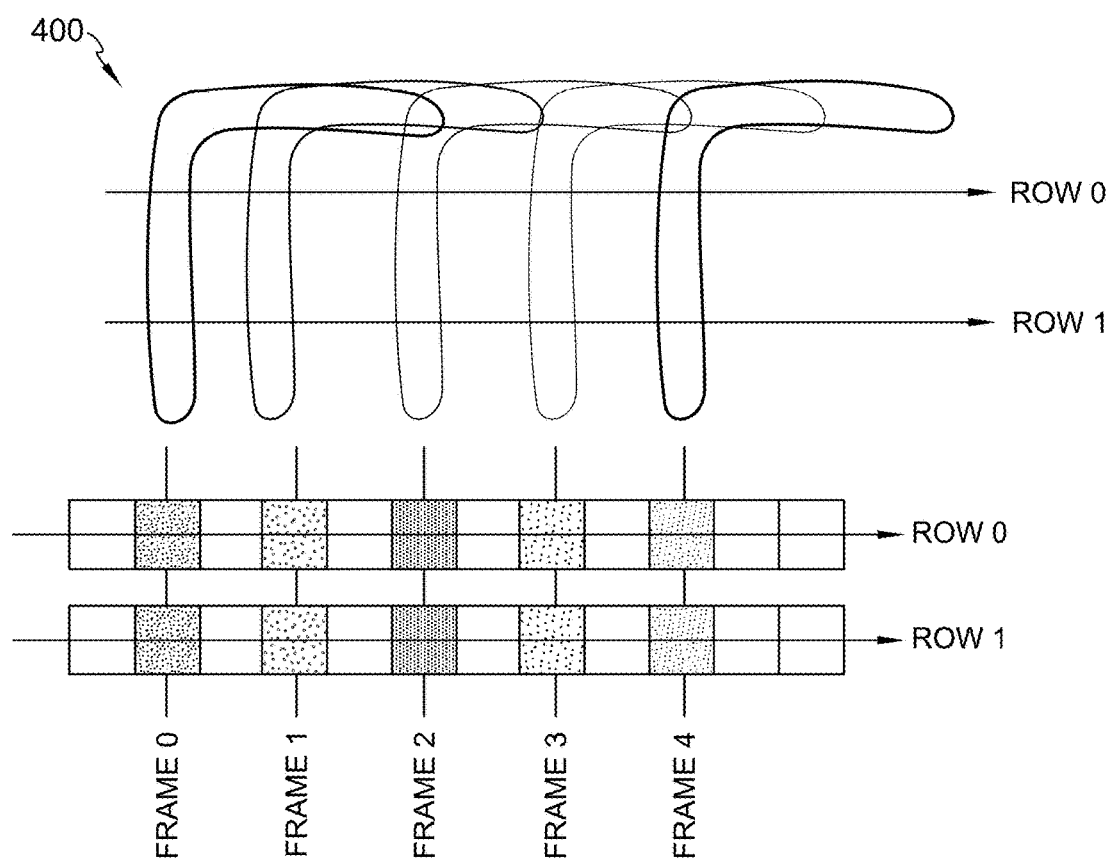
FIG. 6 is an exemplary depiction of the motion of the L-shaped contour of FIG. 5 applying a space-time skew of one pixel provided in accordance with at least one embodiment.

FIG. 6 illustrates an exemplary representation of an object (represented as the contours 400) across multiple frames 0-4 having a space-time skew. More specifically, space-time may be skewed upwards by one pixel such that the contours 400 now line up horizontally. After application of the space-time skew, the 2D velocity of the object may be $v_x=2$ and $v_y=1$ because the space-time skew adjusts the vertical velocity of all objects in the scene by −1 pixel per frame.

Figure 7A:
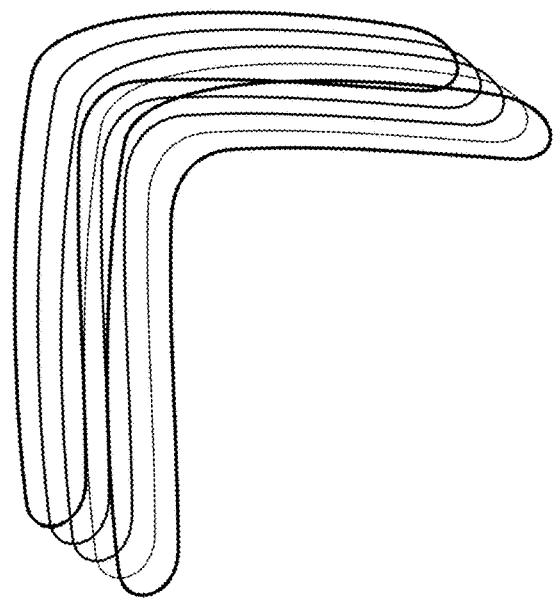
FIGS. 7A and 7B are exemplary depictions of 2D contour velocities developed based on 1D contour velocities provided in accordance with at least one embodiment.
Figure 7B:
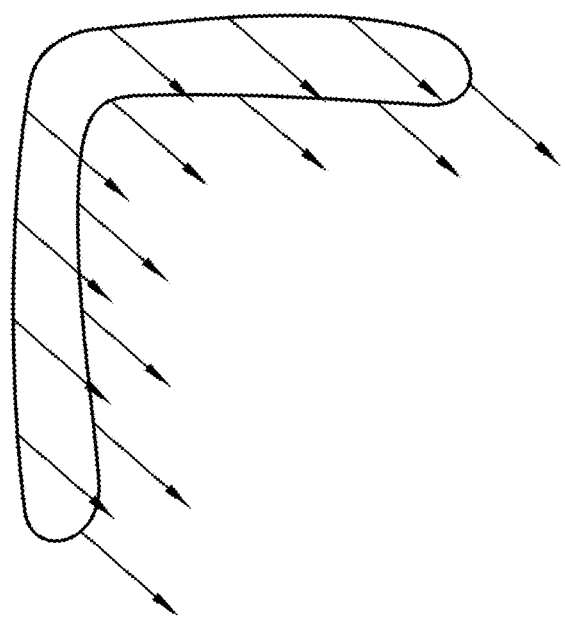

As shown in FIGS. 7A and 7B, 2D root velocities for the contour 400 can be determined from the 1D root velocities applied across multiple orientations. For example, as suggested in FIG. 7A, a 1D root association may be applied across multiple frames along orientation 0 and the horizontal velocity of the object may be determined as $v_x=2$. Similarly, in orientation 2, a 1D root association may be applied across multiple frames and the vertical velocity of the object may be determined as $v_y=1$. As suggested in FIG. 7B, the final velocity may be computed by combining the velocities of the space-time skews and computed velocities. For example, the 1D velocity for the vertical space-time skew ($v_x=0$, $v_y=1$) may be combined with the 1D velocity associated for orientation 0 ($v_x=2$, $v_y=0$) to give a final 2D velocity of ($v_x=2$, $v_y=1$). Accordingly, convergence (or near convergence) of the L-shaped object can indicate reliable detection, tracking, etc. of objects within the image data.

Figure 8:
FIG. 8 is an illustrative depiction of roots being linked to define edges for the exemplary L-shape provided in accordance with at least one embodiment.
Figure 8:
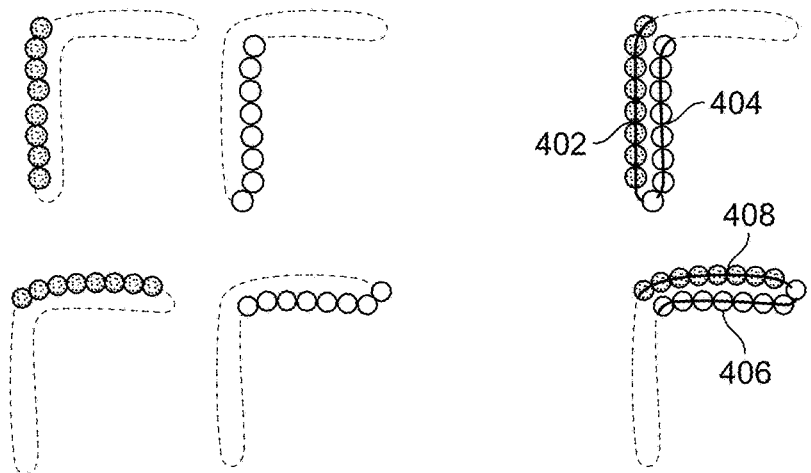
Figure 9:
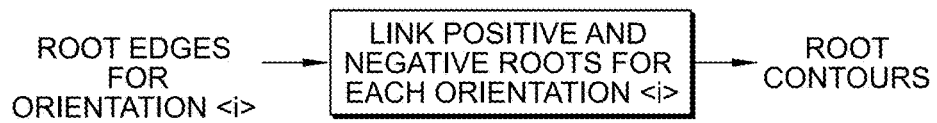
FIG. 9 is an exemplary depiction of edges being connected to form contours provided in accordance with at least one embodiment.
Figure 9:
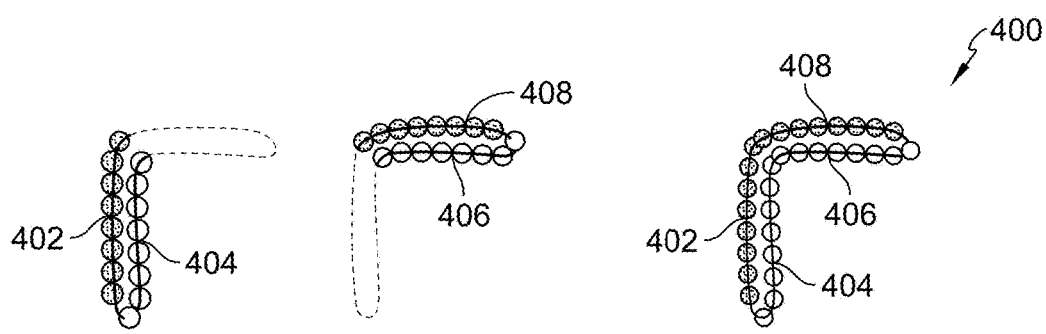
Figure 10:
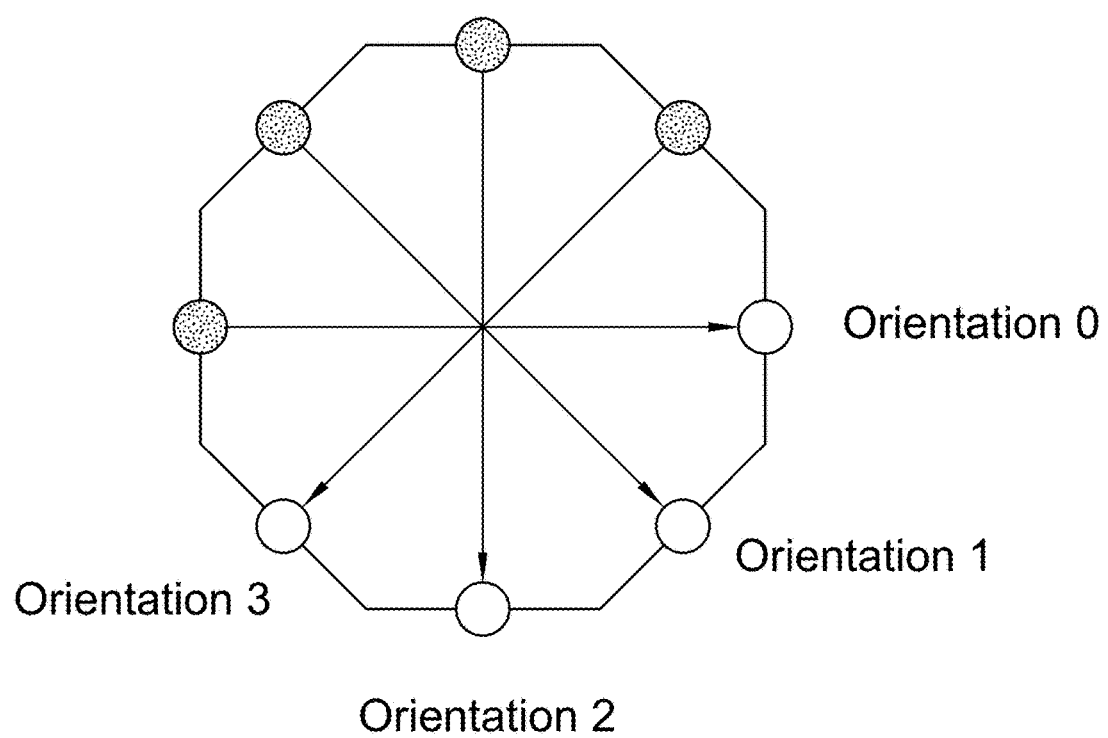
FIG. 10 is an exemplary orientation map provided in accordance with at least one embodiment.

In accordance with at least one embodiment, as shown in FIGS. 8 and 9, to enhance spatial structure, roots can be linked to form edges (e.g., edges 402, 404, 406, 408) according to the link profiles. 2D velocities can be determined from the 1D association of the edges. The edges 402, 404, 406, 408 can further be connected to form contours 400 according to the connection profiles to provide further correspondence in associating elements across frames as shown in FIG. 9. Final 2D root velocities can be computed according to the edge associations. FIG. 10 provides a reference for the orientations as discussed herein.

As shown in FIGS. 11A-11C, contour velocities can be determined based on the 2D root velocities. As shown in FIG. 11A, at 500, 1D association of edges may be conducted for multiple orientations. For example, a 1D association with a vertical skew may be performed for orientation 0 followed by a 1D association with horizontal skew for orientation 2. Subsequently, at 502, the multiple orientations may be applied, for example, as orthogonal orientations, with varying space-time skew angles.

If the determined offset between the edges of the skewed-frames is within the maximum permitted threshold, then 2D velocity for the contour may be determined to generate contour velocities. In the illustrative embodiment, this includes determining the 2D velocity for each root on the contour, but in some embodiments, 2D contour velocities may be determined aggregately from the contours without individual determination for each root. Alternatively, if the determined offset is not within the permitted maximum threshold, then the remote angle and skew values may be altered and 1D association of root edges and orthogonal orientation searching may be performed again to determine compliance with the maximum permitted threshold. As the vertical and horizontal skew angles begin to match the 2D velocity of the object of interest, their corresponding 1D associations may converge. When convergence meets and/or exceeds a threshold, the process may be terminated and a final 2D velocity of the contour may be computed.

As shown in FIGS. 11B and 11C, the 2D contour velocities may be determined based on the 1D edge velocities. In FIG. 11A, a contour 500 is shown in two frames A, B and having edge 502 identified in each frame as 502A, 502B, respectively. Progressing to the right in FIG. 11B, the 1D velocity for the edge 502 may be computed (for example, in the horizontal direction for orientation 0), and progressing again to the right, the a space-time skew may be applied until a convergence threshold is reached. A final 1D contour velocity may be computed after convergence.

FIG. 11C shows another edge 504 of the contour 500 in each frame as 504A, 504B. Progressing to the right in FIG. 11C, the 1D velocity for the edge 504 may be computed (for example, in the vertical direction for orientation 2). Progressing again to the right, a space-time skew may be applied until a convergence threshold is reached. The 1D velocities for all orientations may then be combined to form the 2D velocity for the contour 500 (shown as across frames 0-4).

In accordance with at least some embodiments, using the generated root contours, one dimensional association may be performed for root edges with selected polarities and orientation. The algorithm may successively perform 1D associations along alternating orientations with varying space-time skew angles. For example, a 1D association with a vertical skew may be performed for orientation 0 followed by a 1D association with horizontal skew for orientation 2. This process may be continued for each combination of horizontal and vertical skew angles. As the vertical and horizontal skew angles begin to match the 2D velocity of the object of interest, their corresponding 1D associations should converge. When convergence reaches a threshold (offset within the threshold) the process may be terminated and the final 2D contour velocity may be computed. The 2D velocity of the object can, thus, be generated with accuracy and confidence with reduced computational power.

Figure 12:
FIG. 12 is a graphical output of roots within a field of view across multiple frames provided in accordance with at least one embodiment.

FIG. 12 illustrates an example of contours generated by the operations performed in FIG. 11A in accordance with disclosed embodiments. FIG. 12 is a result of those operations performed on a Stock Mobileye image of size 1280× 720 @36 fps with red pixel. The distinctive representation of a drawing of a bicycle on a sign can be perceived amid the multiple contours, however, the relevance of the contour determinations can be seen in the high degree of correspondence between the contours of different overlaid frames. This high correspondence provides high accuracy, precision, and confidence in image recognition and processing.

As mentioned above, the devices, systems, and methods for contour determination and/or 2D association velocity determination can be applied with digital NM systems, for example, the digital NM detector 110. In accordance with at least one disclosed embodiment, spike data may be augmented or used in combination with image data generated by filtering incoming image data using a color opposite adaptive threshold. In such an implementation, the use of center surround filters (like center-surround receptive fields in the retina of an eye) may be used to generate image data from which zero-crossings can be generated as roots. Such capabilities have particular technical utility alone, and when combined with the other functionality described herein because they enable the ability to use the zero-crossing data to identify and utilize root data (e.g., root polynomial data) to attain sub-pixel accuracy.

Figure 13:
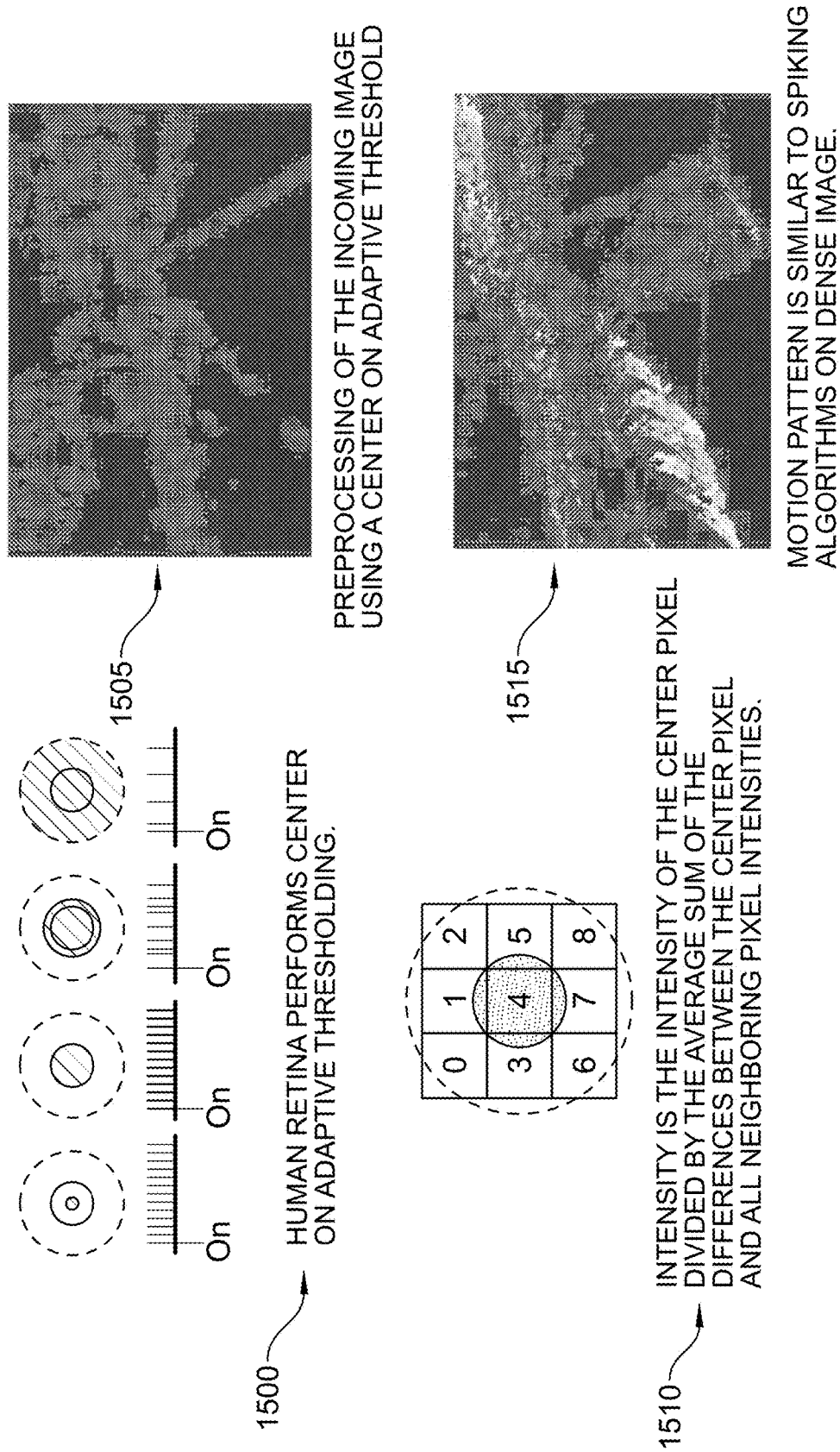
FIG. 13 provides a exemplary illustration of a center-surround filter utilized in accordance with at least one embodiment.

As mentioned above, the transformation of the input image can be performed using a center-on adaptive threshold. The human retina performs center-surround adaptive thresholding on input images. A center-surround filter 1500 is illustratively defined by an inner ring and an outer ring as shown in FIG. 13. The center-surround filter 1500 is applied to the input image at 1510. Two basic varieties of such filters include: center-on/surround-off, and center-off/surround-on. For the center-on/surround off variety, the intensity of the center pixel may be computed by subtracting the average intensity of the pixels in the inner ring from the average intensity of the pixels in the outer ring. For center-off/surround-on, the center pixel may be computed by subtracting the average intensity of the pixels in the outer ring from the average intensity of the pixels in the inner ring. The resulting output of applying a center-surround to an input image is shown as the motion patterns 1505.

The resulting motion patterns of 1505 are similar to that of the original input images. In the illustrative embodiment, the resulting motion patterns 1505 are exemplary embodiments of the blobs from which the roots can be extracted. Accordingly, the roots can be generated based on the application of the center surround filter. In the illustrative embodiment, roots may be extracted from the blobs by electronically applying an ocular micro-tremor (low amplitude, high frequency oscillation) and computing zero-crossings of the blob image along multiple orientation angles.

In accordance with at least some disclosed embodiments, the disclosed embodiments may be used to obtain image data and analyze that image data to improve operation, assistance, control and/or analysis of image data in vehicle driving scenarios, for example, but not limited to those used in driver assist functionality, automated/autonomous driving functionality, and the like.

Indeed, conventional image processing, object detection, classification, and tracking are the most challenging tasks in assisted and autonomous driving especially in bad environments, bad lighting conditions, and low false positive/negative rates. Disclosed embodiments enable an increase in the speed, robustness and effectiveness in image processing by reducing extraneous data previously necessary to perform object detection, classification and tracking. Additional utility is provided as well including image data compression, deep learning capabilities with machine learning.

The large quantity of data not only causes storage challenges but also challenges regarding processor capabilities for analyzing such data in an effective manner. Such a large amount of generated data is not useful for driver assistance or autonomous driving applications if the data cannot be analyzed in a timely manner to provide direction and/or control.

Disclosed embodiments may be implemented in conjunction with components of autonomous driving systems and driver assistance systems included in automotive vehicles. Thus, the utility of the disclosed embodiments within those technical contexts is described in detail. However, the scope of the innovative concepts disclosed herein is not limited to those technical contexts. Therefore, it should be understood that the disclosed embodiments provide utility in all aspects of image processing and control, analysis and diagnostic systems utilizing image processing.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

We claim:

1. A neuromorphic vision system for generating and processing image data within a field of view, the system comprising:

an image sensor comprising a plurality of photoreceptors each generating image data corresponding to the field of view and indicating whether an intensity value measured by the photoreceptors, a digital retina in communication with the image sensor to receive image data from the image sensor, the digital retina generating shapelet data based on the image data received from the image sensor; and a means for generating contours corresponding to the field of view based on the shapelet data, the means for generating contours arranged in communication with the digital retina to receive the shapelet data and configured (i) to identify roots based on the shapelet data according to predetermined root profiles, (ii) to link a number of the roots according to predetermined link profiles to form a number of edges, and (iii) to connect the number of edges according to predetermined connection profiles to define at least one contour.

2. The neuromorphic vision system of claim 1, wherein the at least one contour includes at least one orientation contour based on at least one predetermined orientation.

3. The neuromorphic vision system of claim 2, wherein the at least one orientation contour includes a first orientation contour based on a first predetermined orientation and a second orientation contour based on a second predetermined orientation.

4. The neuromorphic vision system of claim 3, wherein the first and second predetermined angles are about 45 degrees apart.

5. The neuromorphic vision system of claim 3, wherein the first and second predetermined angles are about 90 degrees apart.

6. The neuromorphic vision system of claim 3, wherein the means for generating contours is further configured to generate full contours based on the first and second orientation contours.

7. The neuromorphic vision system of claim 5, wherein the full contours are generated based on correspondence between the first and second orientation contours.

8. The neuromorphic vision system of claim 1, wherein each root is defined as a zero-crossing having one of positive or negative polarity and lying on one of a number of predefined intervals along a first dimension in a two-dimensional, Cartesian coordinate system.

9. The neuromorphic vision system of claim 8, wherein a number of the roots are spaced apart by at least one pixel width.

10. The neuromorphic vision system of claim 8, wherein the predetermined link profiles include linking together a pair of roots having common polarity.

11. The neuromorphic vision system of claim 8, wherein the predetermined link profiles include linking together a pair of the roots having common polarity which lie on adjacent ones of the predefined intervals.

12. The neuromorphic vision system of claim 8, wherein the predetermined link profiles include not linking together a pair the roots having common polarity which lie on adjacent ones of the predefined intervals based on the presence one of the roots having non-common polarity lying on one of the adjacent predefined intervals and between the pair of the roots along a second dimension.

13. The neuromorphic vision system of claim 8, wherein the predetermined link profiles include shifting a position of a first root along its corresponding predefined interval based on the presence of a second root having non-common polarity lying on an adjacent predefined interval with equal position in a second dimension to the first root.

14. The neuromorphic vision system of claim 1, wherein each root is defined as one of a dot, a top-end, a bottom end, and an edge root based on the predetermined link profiles.

15. The neuromorphic vision system of claim 14, wherein the predetermined connection profiles include connecting adjacent top-end roots together with zero intervening dot roots or with an even number of intervening dot roots.

16. The neuromorphic vision system of claim 14, wherein the predetermined connection profiles include connecting a top-end root together with an adjacent bottom-end root with an odd number of intervening dot roots.

17. The neuromorphic vision system of claim 14, wherein the predetermined connection profiles include connecting pairs of edges together by connecting together roots of each of the pair of edges which lie on adjacent ones of a number of predefined intervals along a first dimension in a two-dimensional, Cartesian coordinate system.

18. The neuromorphic vision system of claim 17, wherein the predetermined connection profiles are applied along the first dimension from an edge root.

19. A method of conducting neuromorphic vision using a neuromorphic vision system for generating and processing image data within a field of view, the method comprising:
receiving shapelet data corresponding to the field of vision, the shapelet data being generated based on image data generated by an image sensor that includes a plurality of photoreceptors each generating image data corresponding to the field of view;
identifying roots based on the shapelet data according to predetermined root profiles;
linking a number of the roots according to predetermined link profiles to form a number of edges; and
connecting the number of edges according to predetermined connection profiles to define at least one contour.

20. An automated vehicle system for providing partially or fully automated operation, the system comprising:
a vehicle chassis adapted for driven motion by a power source
and
a neuromorphic vision system for generating and processing image data within a field of view including an image sensor comprising a plurality of photoreceptors each generating image data corresponding to the field of view and indicating whether an intensity value measured by the photoreceptors, a digital retina in communication with the image sensor to receive image data from the image sensor, the digital retina generating shapelet data based on the image data received from the image sensor; and
a means for generating contours corresponding to the field of view based on the shapelet data, the means for generating contours arranged in communication with the digital retina to receive the shapelet data and configured (i) to identify roots based on the shapelet data according to predetermined root profiles, (ii) to link a number of the roots according to predetermined link profiles to form a number of edges, and (iii) to connect the number of edges according to predetermined connection profiles to define at least one contour;
wherein the neuromorphic vision system is in communication with on vehicle automation and assistive control equipment to communicate the at least one contour for consideration in guiding vehicle motion.

21. The method of claim 19, wherein the at least one contour includes at least one orientation contour based on at least one predetermined orientation.

22. The method of claim 21, wherein the at least one orientation contour includes a first orientation contour based on a first predetermined orientation and a second orientation contour based on a second predetermined orientation.

23. The method of claim 22, wherein the first and second predetermined angles are about 45 degrees apart.

24. The method of claim 22, wherein the first and second predetermined angles are about 90 degrees apart.

25. The method of claim 22, wherein the means for generating contours is further configured to generate full contours based on the first and second orientation contours.

26. The method of claim 24, wherein the full contours are generated based on correspondence between the first and second orientation contours.

27. The method of claim 19, wherein each root is defined as a zero-crossing having one of positive or negative polarity and lying on one of a number of predefined intervals along a first dimension in a two-dimensional, Cartesian coordinate system.

28. The method of claim 27, wherein a number of the roots are spaced apart by at least one pixel width.

29. The method of claim 27, wherein the predetermined link profiles include linking together a pair of roots having common polarity.

30. The method of claim 27, wherein the predetermined link profiles include linking together a pair of the roots having common polarity which lie on adjacent ones of the predefined intervals.

31. The method of claim 27, wherein the predetermined link profiles include not linking together a pair the roots having common polarity which lie on adjacent ones of the predefined intervals based on the presence one of the roots having non-common polarity lying on one of the adjacent predefined intervals and between the pair of the roots along a second dimension.

32. The method of claim 27, wherein the predetermined link profiles include shifting a position of a first root along its corresponding predefined interval based on the presence of a second root having non-common polarity lying on an adjacent predefined interval with equal position in a second dimension to the first root.

33. The method of claim 19, wherein each root is defined as one of a dot, a top-end, a bottom end, and an edge root based on the predetermined link profiles.

34. The method of claim 33, wherein the predetermined connection profiles include connecting adjacent top-end roots together with zero intervening dot roots or with an even number of intervening dot roots.

35. The method of claim 33, wherein the predetermined connection profiles include connecting a top-end root together with an adjacent bottom-end root with an odd number of intervening dot roots.

36. The method of claim 33, wherein the predetermined connection profiles include connecting pairs of edges together by connecting together roots of each of the pair of edges which lie on adjacent ones of a number of predefined intervals along a first dimension in a two-dimensional, Cartesian coordinate system.

37. The method of claim 36, wherein the predetermined connection profiles are applied along the first dimension from an edge root.

38. The automated vehicle system of claim 20, wherein the at least one contour includes at least one orientation contour based on at least one predetermined orientation.

39. The automated vehicle system of claim 38, wherein the at least one orientation contour includes a first orientation contour based on a first predetermined orientation and a second orientation contour based on a second predetermined orientation.

40. The automated vehicle system of claim 39, wherein the first and second predetermined angles are about 45 degrees apart.

41. The automated vehicle system of claim 39, wherein the first and second predetermined angles are about 90 degrees apart.

42. The automated vehicle system of claim 39, wherein the means for generating contours is further configured to generate full contours based on the first and second orientation contours.

43. The automated vehicle system of claim 41, wherein the full contours are generated based on correspondence between the first and second orientation contours.

44. The automated vehicle system of claim 20, wherein each root is defined as a zero-crossing having one of positive or negative polarity and lying on one of a number of predefined intervals along a first dimension in a two-dimensional, Cartesian coordinate system.

45. The automated vehicle system of claim 44, wherein a number of the roots are spaced apart by at least one pixel width.

46. The automated vehicle system of claim 44, wherein the predetermined link profiles include linking together a pair of roots having common polarity.

47. The automated vehicle system of claim 44, wherein the predetermined link profiles include linking together a pair of the roots having common polarity which lie on adjacent ones of the predefined intervals.

48. The automated vehicle system of claim 44, wherein the predetermined link profiles include not linking together a pair the roots having common polarity which lie on adjacent ones of the predefined intervals based on the presence one of the roots having non-common polarity lying on one of the adjacent predefined intervals and between the pair of the roots along a second dimension.

49. The automated vehicle system of claim 44, wherein the predetermined link profiles include shifting a position of a first root along its corresponding predefined interval based on the presence of a second root having non-common polarity lying on an adjacent predefined interval with equal position in a second dimension to the first root.

50. The automated vehicle system of claim 20, wherein each root is defined as one of a dot, a top-end, a bottom end, and an edge root based on the predetermined link profiles.

51. The automated vehicle system of claim 50, wherein the predetermined connection profiles include connecting adjacent top-end roots together with zero intervening dot roots or with an even number of intervening dot roots.

52. The automated vehicle system of claim 50, wherein the predetermined connection profiles include connecting a top-end root together with an adjacent bottom-end root with an odd number of intervening dot roots.

53. The automated vehicle system of claim 50, wherein the predetermined connection profiles include connecting pairs of edges together by connecting together roots of each of the pair of edges which lie on adjacent ones of a number of predefined intervals along a first dimension in a two-dimensional, Cartesian coordinate system.

54. The automated vehicle system of claim 53, wherein the predetermined connection profiles are applied along the first dimension from an edge root.

55. A neuromorphic vision system for generating and processing image data within a field of view, the system comprising:
an image sensor comprising a plurality of photoreceptors each generating image data corresponding to the field of view and indicating whether an intensity value measured by the photoreceptors,
a digital retina in communication with the image sensor to receive image data from the image sensor, the digital retina generating shapelet data based on the image data received from the image sensor; and
an object signature detector that generates contours corresponding to the field of view based on the shapelet data, the object signature detector being arranged in communication with the digital retina to receive the shapelet data and configured (i) to identify roots based on the shapelet data according to predetermined root profiles, (ii) to link a number of the roots according to predetermined link profiles to form a number of edges, and (iii) to connect the number of edges according to predetermined connection profiles to define at least one contour.

56. The neuromorphic vision system of claim 55, wherein the at least one contour includes at least one orientation contour based on at least one predetermined orientation.

57. The neuromorphic vision system of claim 56, wherein the at least one orientation contour includes a first orientation contour based on a first predetermined orientation and a second orientation contour based on a second predetermined orientation.

58. The neuromorphic vision system of claim 56, wherein the first and second predetermined angles are about 45 degrees apart.

59. The neuromorphic vision system of claim 56, wherein the first and second predetermined angles are about 90 degrees apart.

60. The neuromorphic vision system of claim 56, wherein the object signature detector is further configured to generate full contours based on the first and second orientation contours.

61. The neuromorphic vision system of claim 59, wherein the full contours are generated based on correspondence between the first and second orientation contours.

62. The neuromorphic vision system of claim 55, wherein each root is defined as a zero-crossing having one of positive or negative polarity and lying on one of a number of predefined intervals along a first dimension in a two-dimensional, Cartesian coordinate system.

63. The neuromorphic vision system of claim 62, wherein a number of the roots are spaced apart by at least one pixel width.

64. The neuromorphic vision system of claim 62, wherein the predetermined link profiles include linking together a pair of roots having common polarity.

65. The neuromorphic vision system of claim 62, wherein the predetermined link profiles include linking together a pair of the roots having common polarity which lie on adjacent ones of the predefined intervals.

66. The neuromorphic vision system of claim 62, wherein the predetermined link profiles include not linking together a pair the roots having common polarity which lie on adjacent ones of the predefined intervals based on the presence one of the roots having non-common polarity lying on one of the adjacent predefined intervals and between the pair of the roots along a second dimension.

67. The neuromorphic vision system of claim 62, wherein the predetermined link profiles include shifting a position of a first root along its corresponding predefined interval based on the presence of a second root having non-common polarity lying on an adjacent predefined interval with equal position in a second dimension to the first root.

68. The neuromorphic vision system of claim 55, wherein each root is defined as one of a dot, a top-end, a bottom end, and an edge root based on the predetermined link profiles.

69. The neuromorphic vision system of claim 68, wherein the predetermined connection profiles include connecting adjacent top-end roots together with zero intervening dot roots or with an even number of intervening dot roots.

70. The neuromorphic vision system of claim 68, wherein the predetermined connection profiles include connecting a top-end root together with an adjacent bottom-end root with an odd number of intervening dot roots.

71. The neuromorphic vision system of claim 68, wherein the predetermined connection profiles include connecting pairs of edges together by connecting together roots of each of the pair of edges which lie on adjacent ones of a number of predefined intervals along a first dimension in a two-dimensional, Cartesian coordinate system.

72. The neuromorphic vision system of claim 71, wherein the predetermined connection profiles are applied along the first dimension from an edge root.

* * * * *